Feb. 28, 1961   F. C. DU GRENIER ET AL   2,973,075
ELECTRIC VENDING MACHINES
Filed Feb. 18, 1954   22 Sheets-Sheet 13
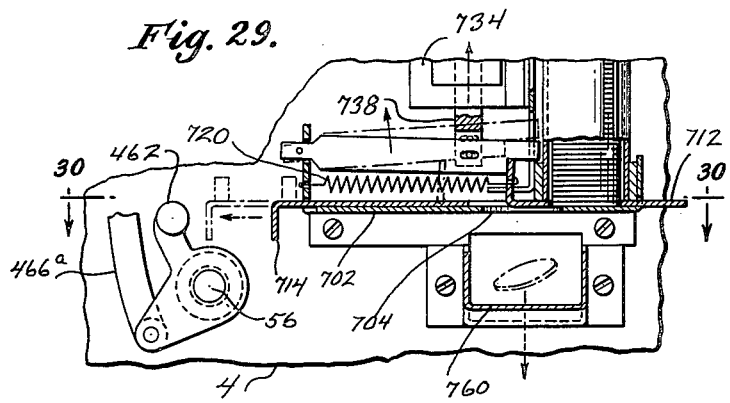
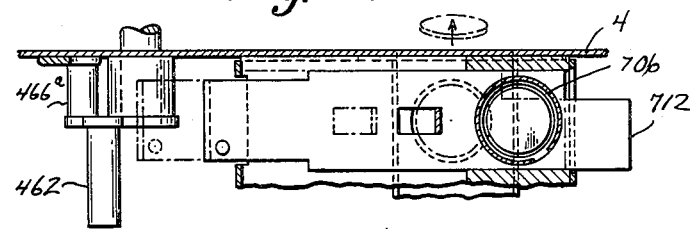
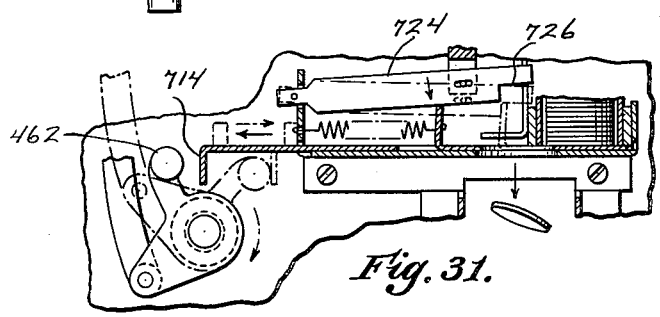
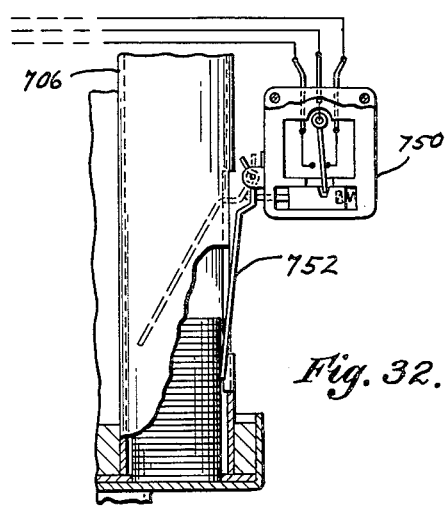
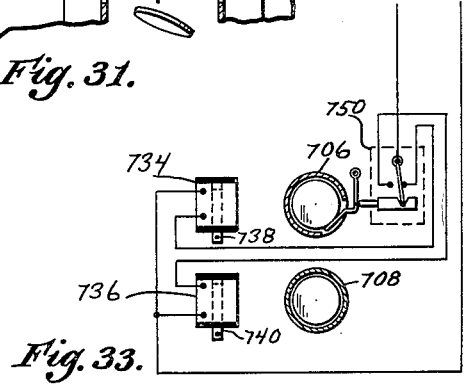
Inventors,
Francis C. Du Grenier,
Frank B. Perri,
by Heard, Smith, Porter & Chittick
Attys.

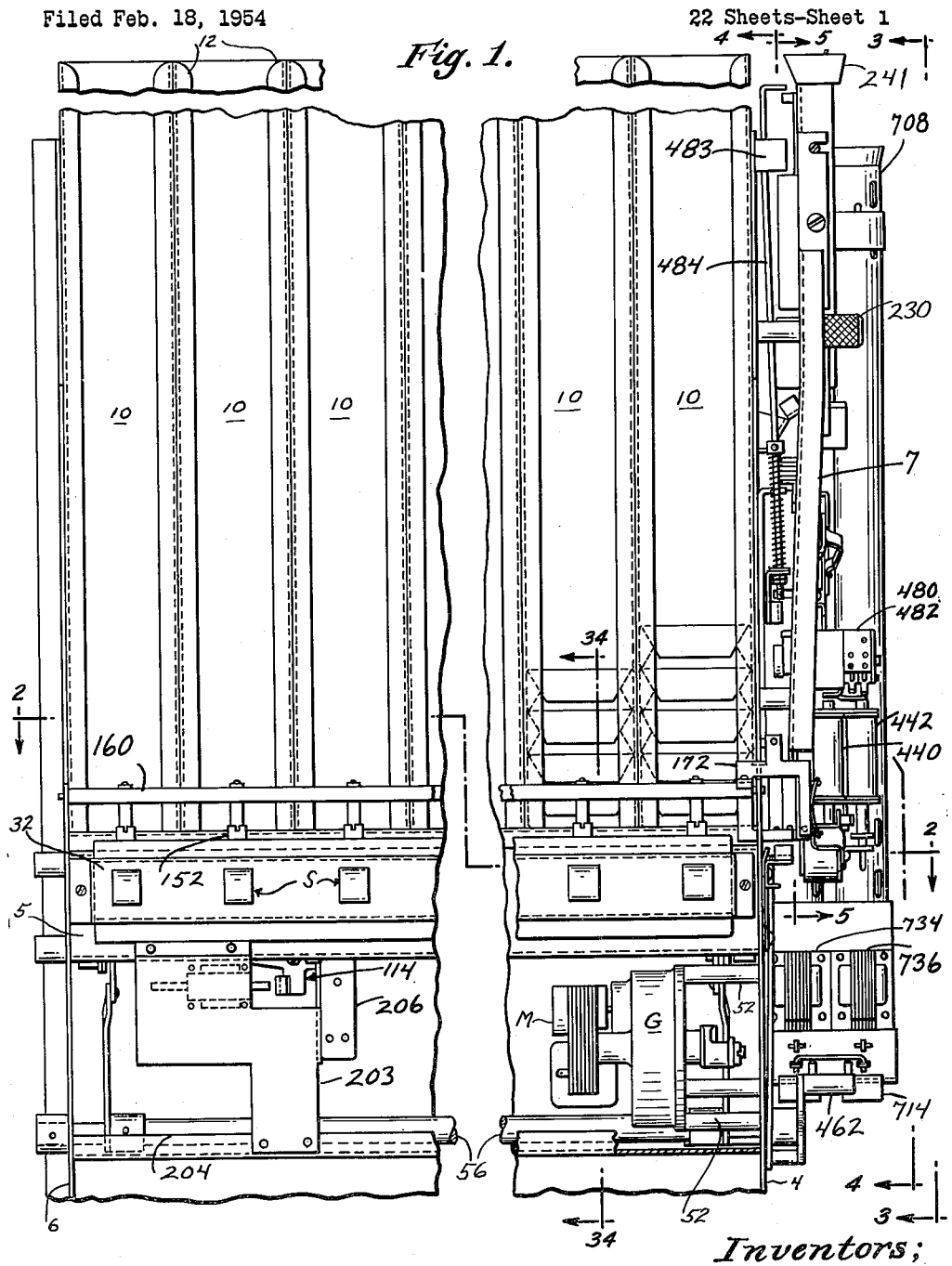

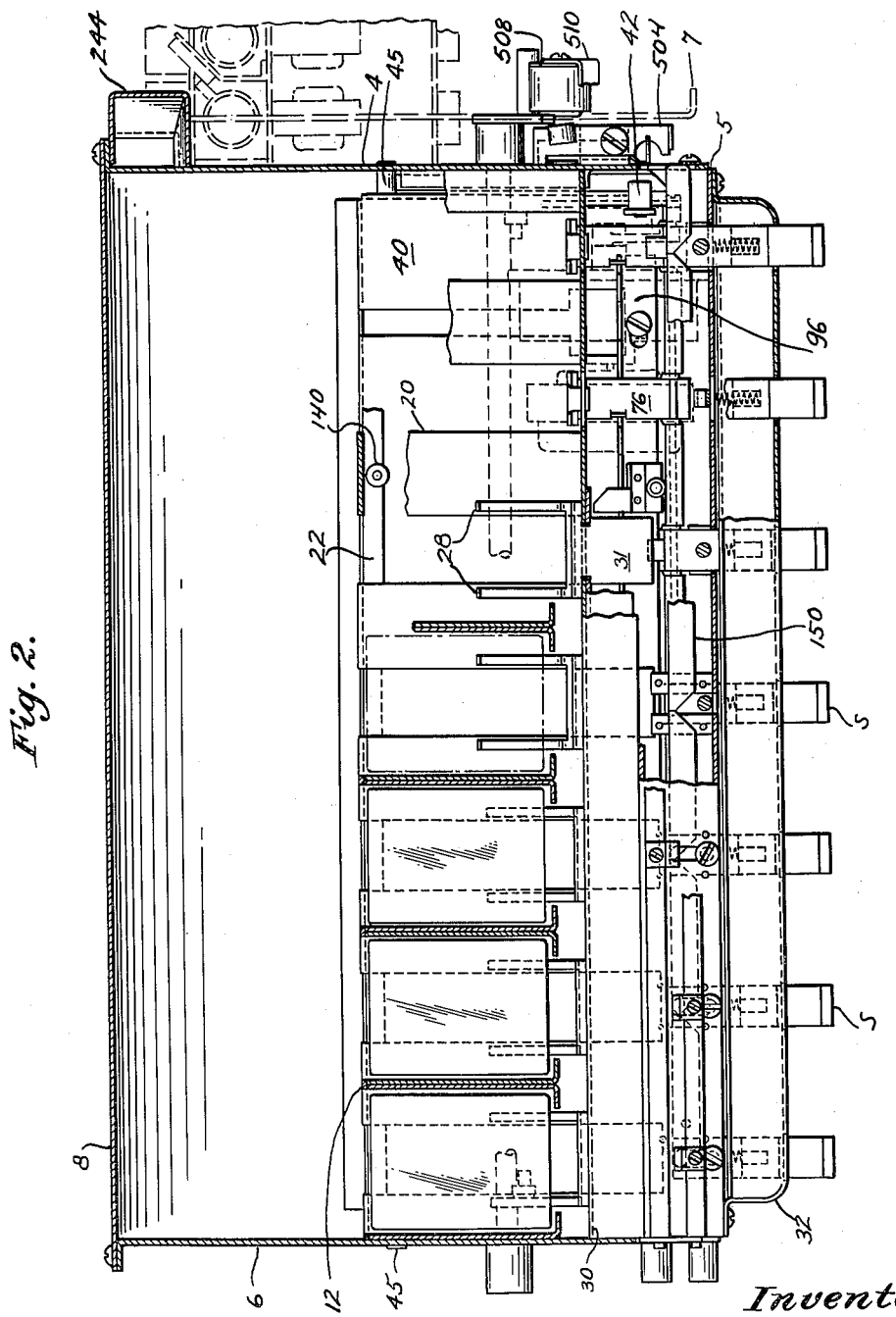

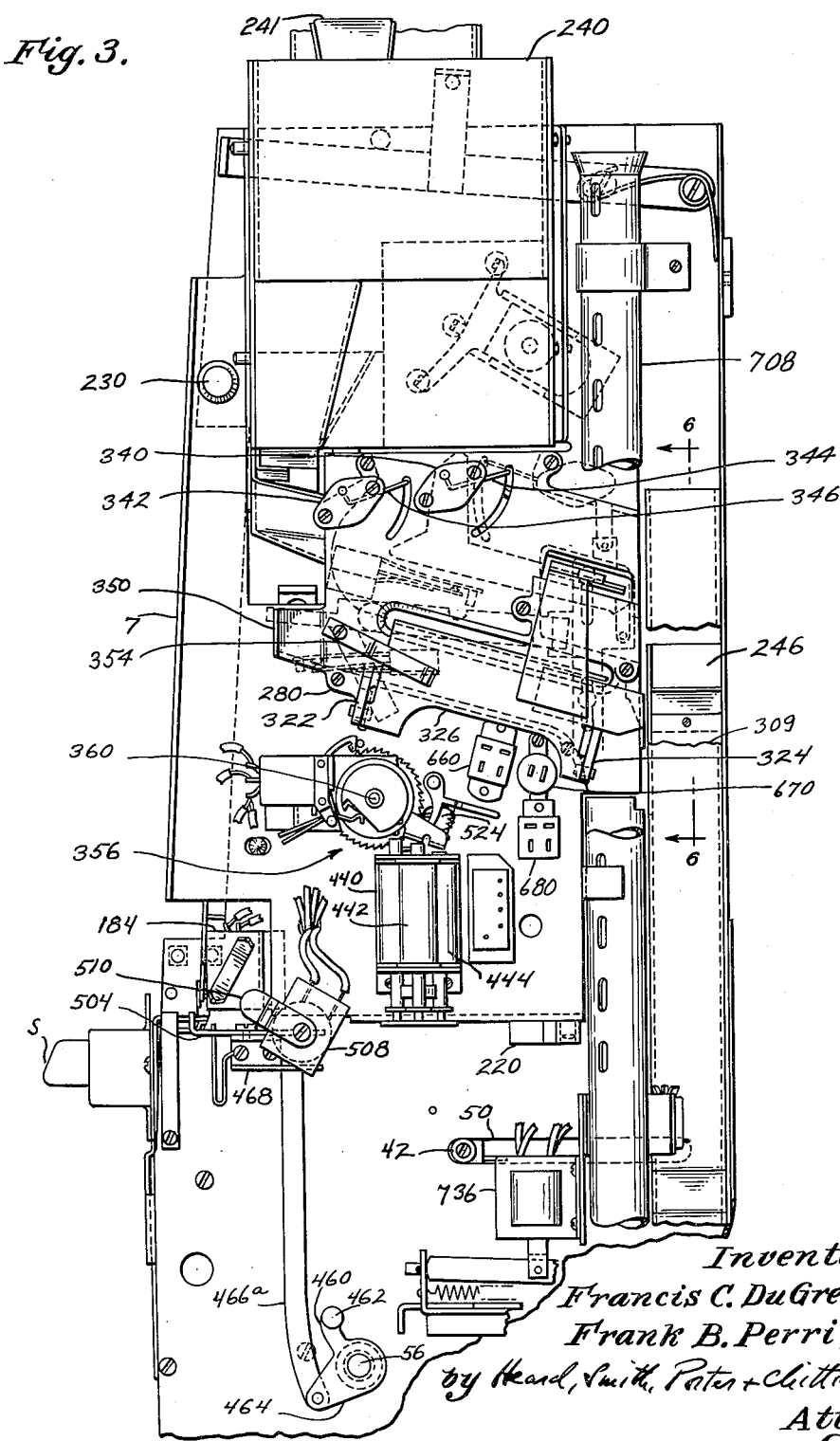

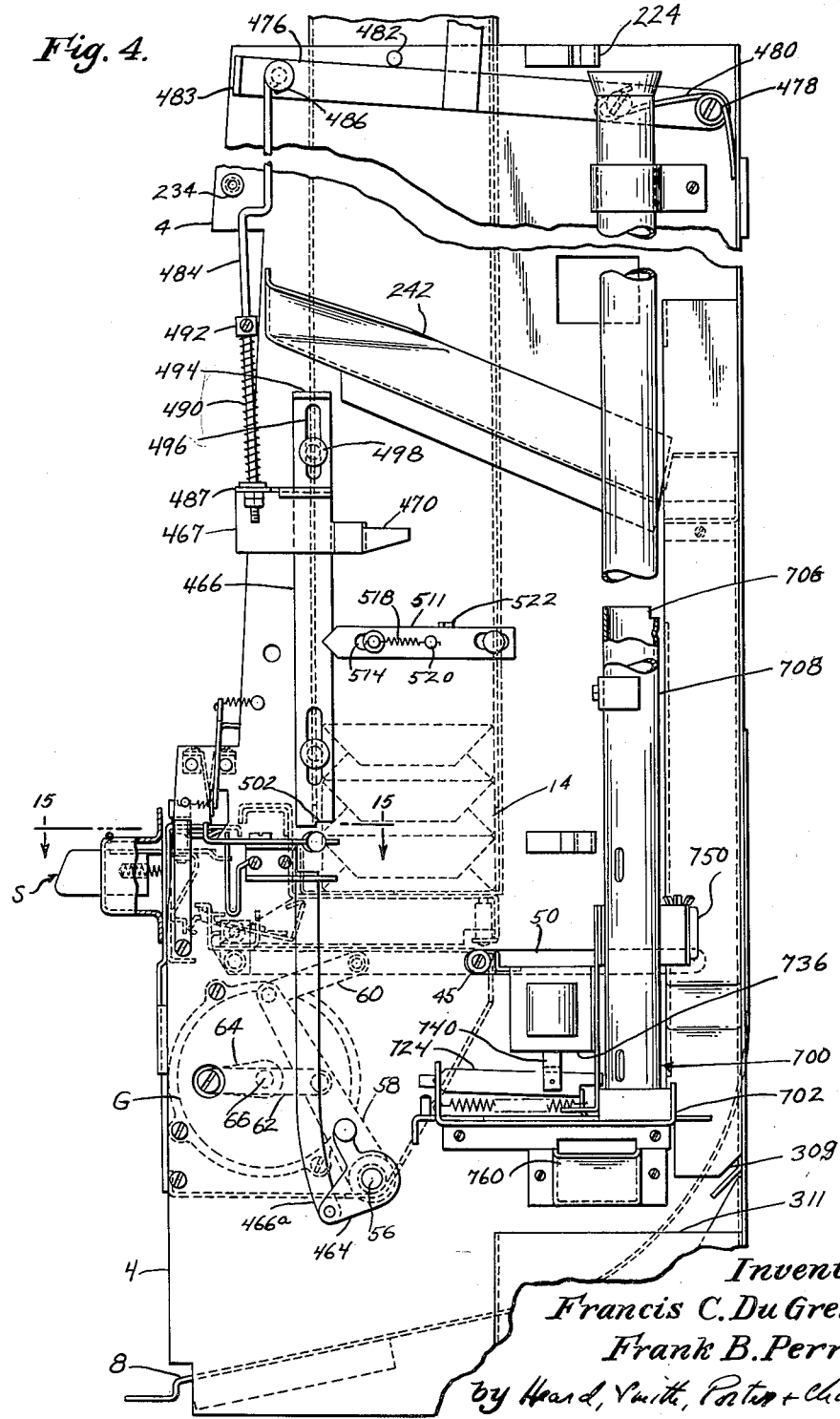

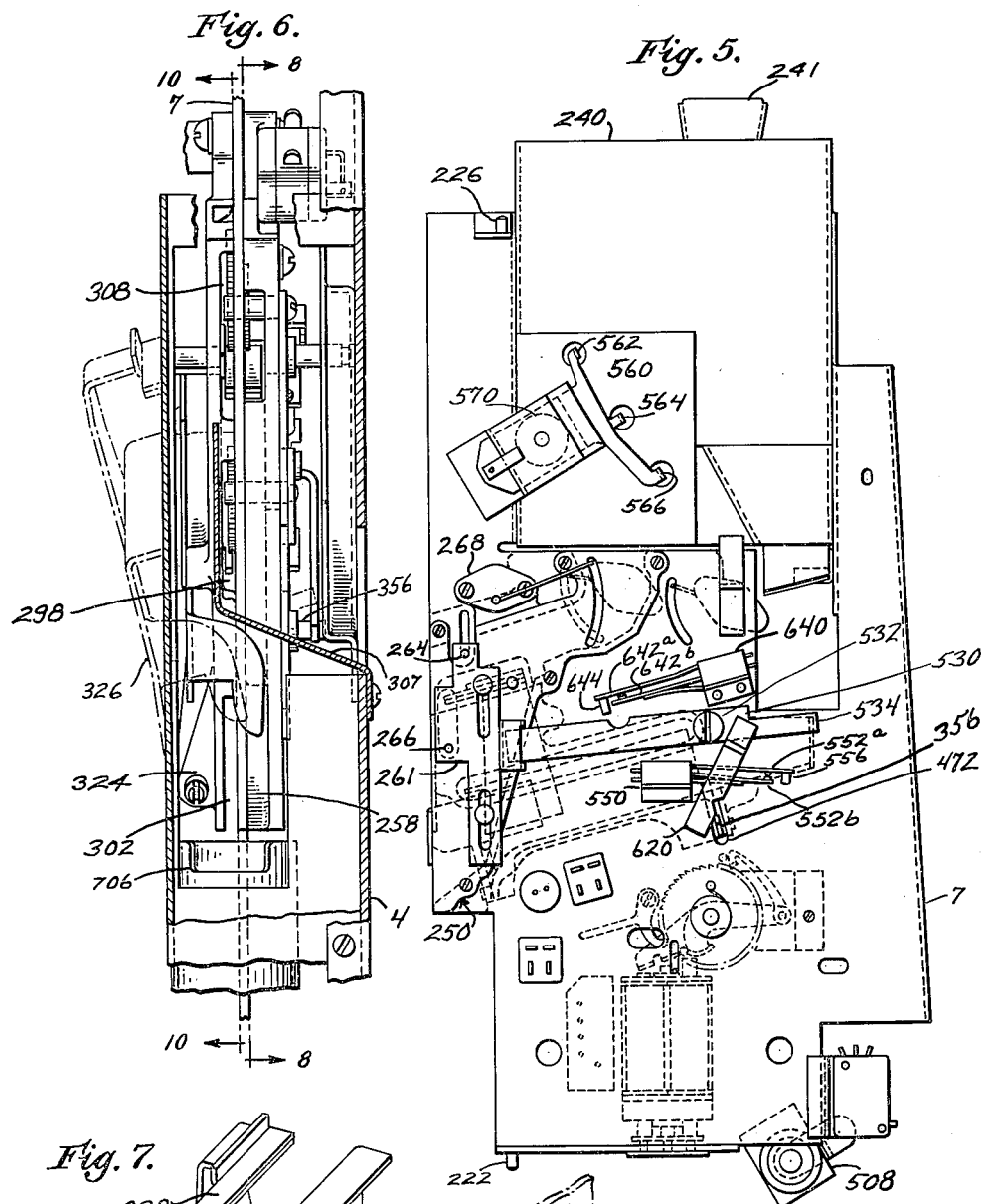

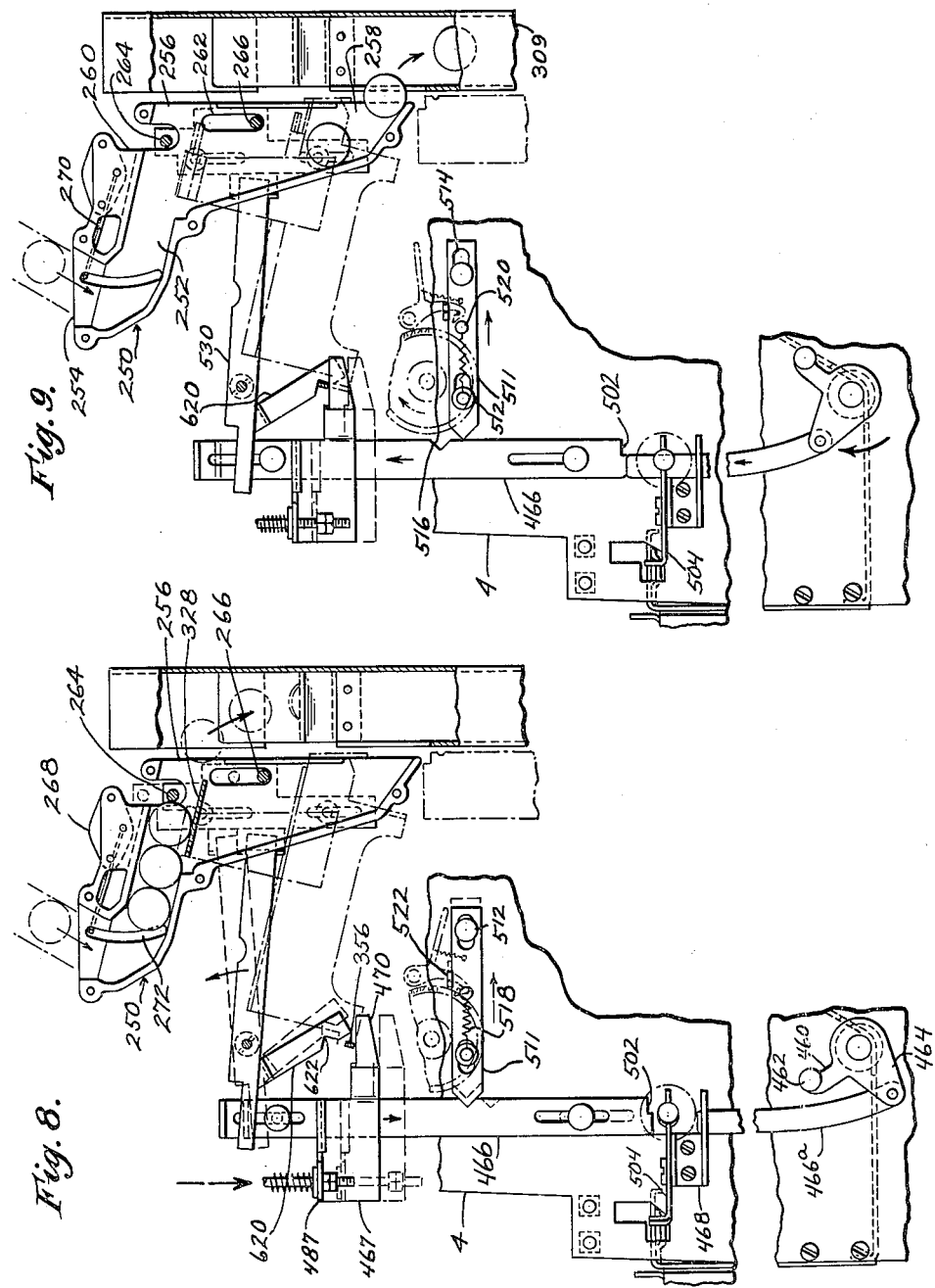

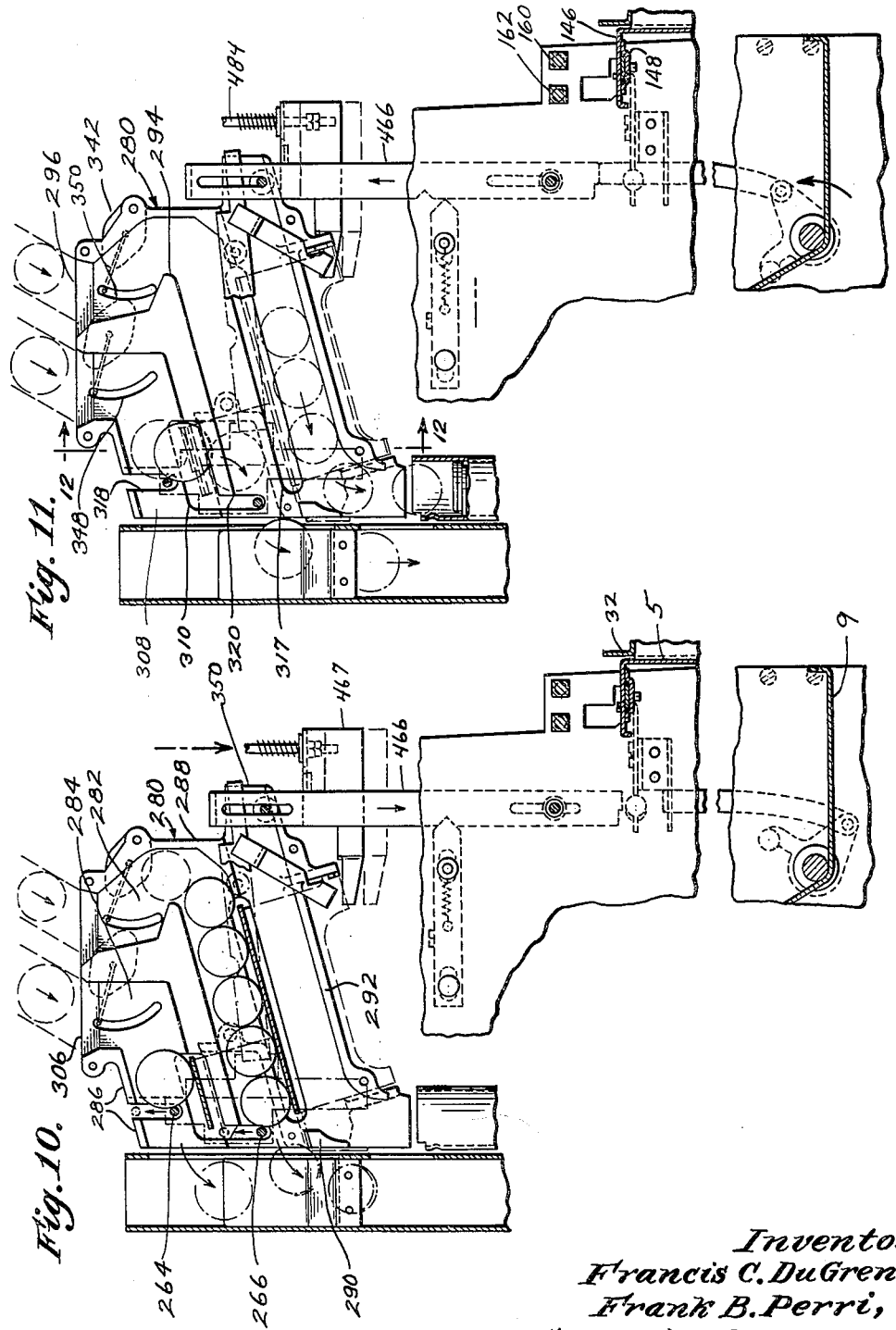

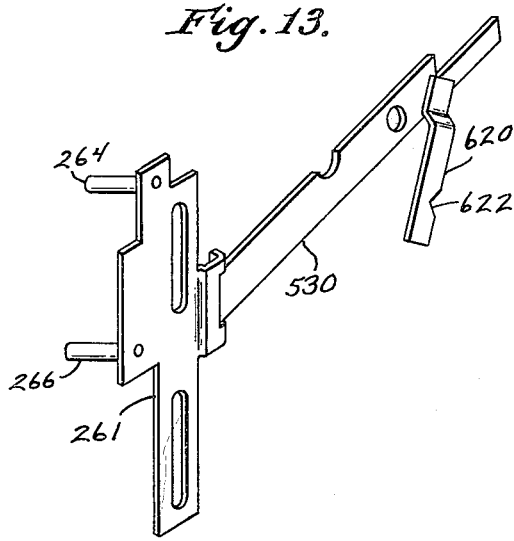
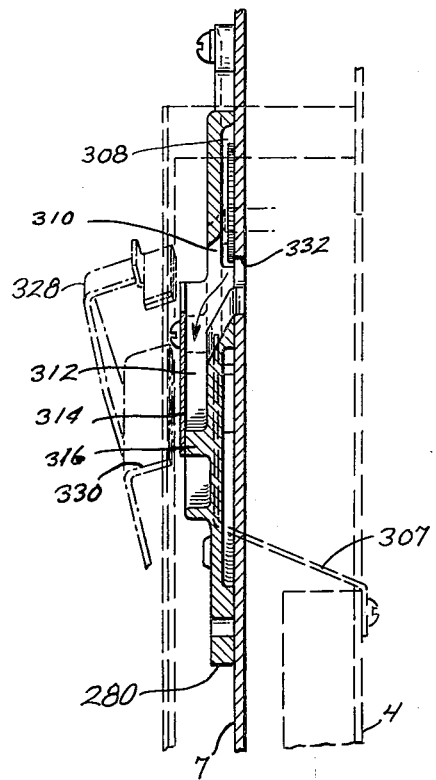
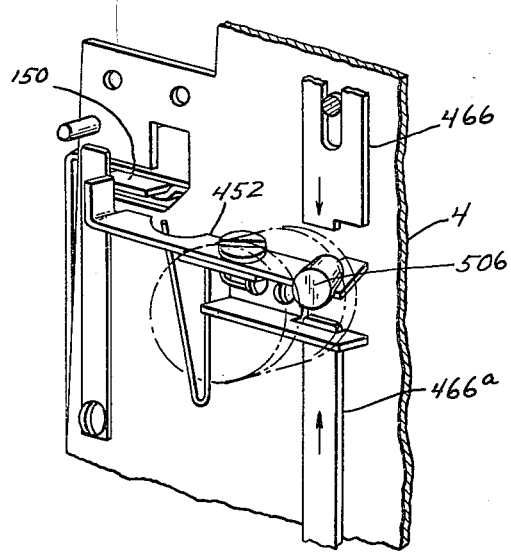

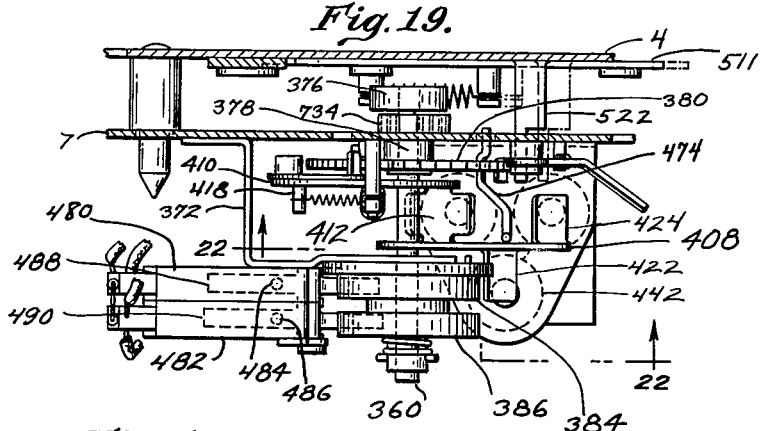
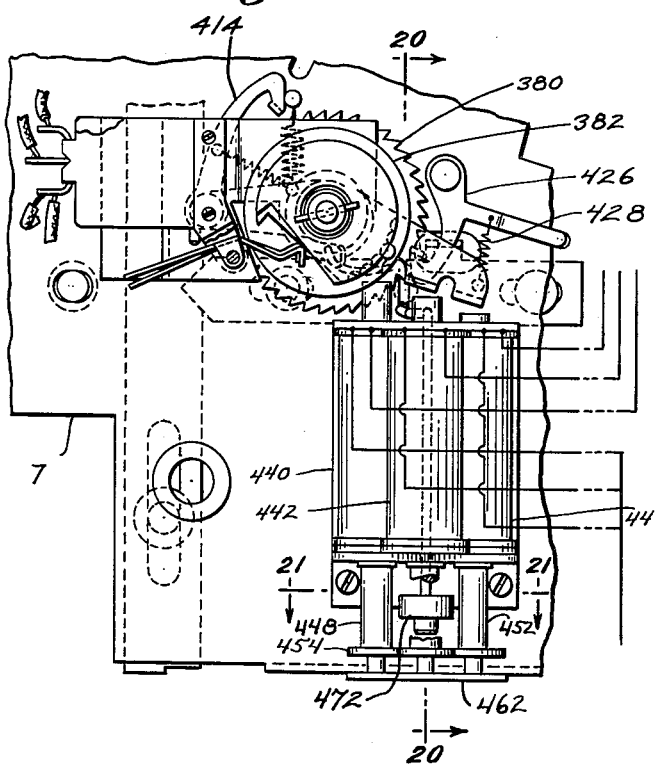
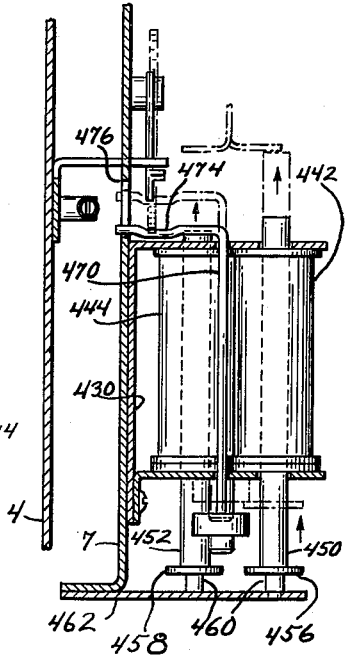
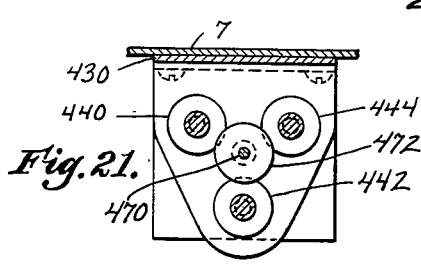
Inventors;
Francis C. DuGrenier,
Frank B. Perri,
by Heard, Smith, Porter + Chittick
Attys.

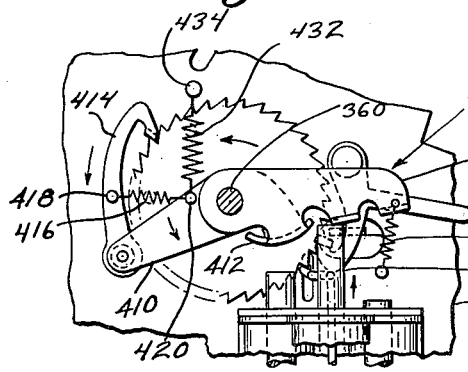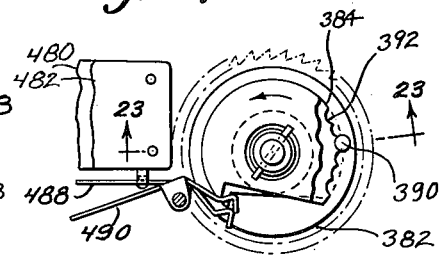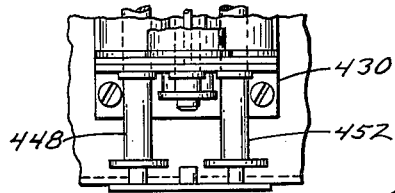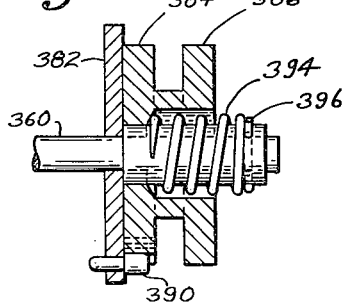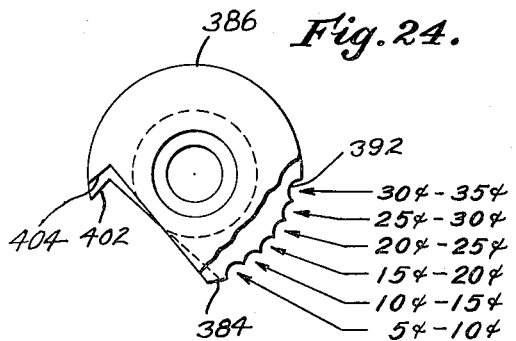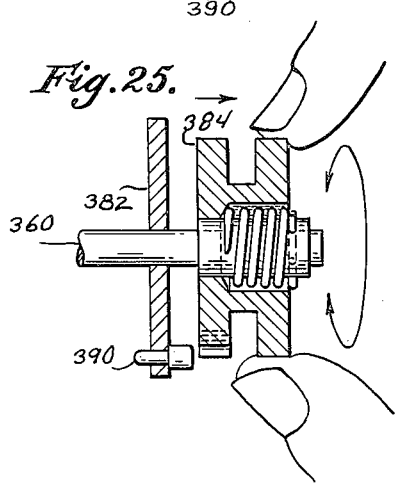

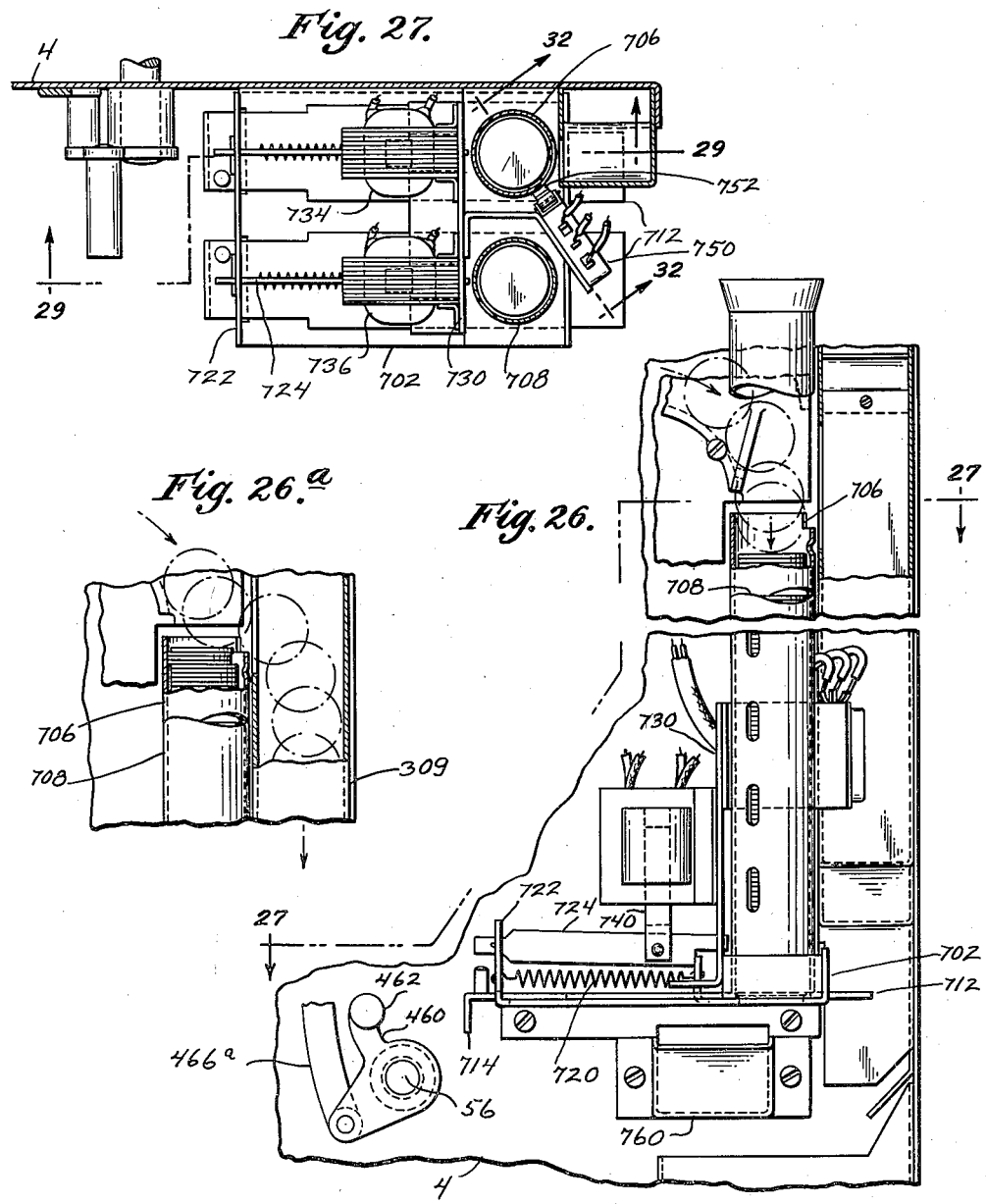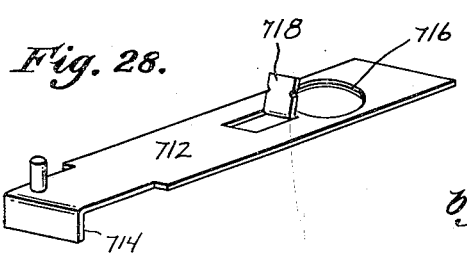

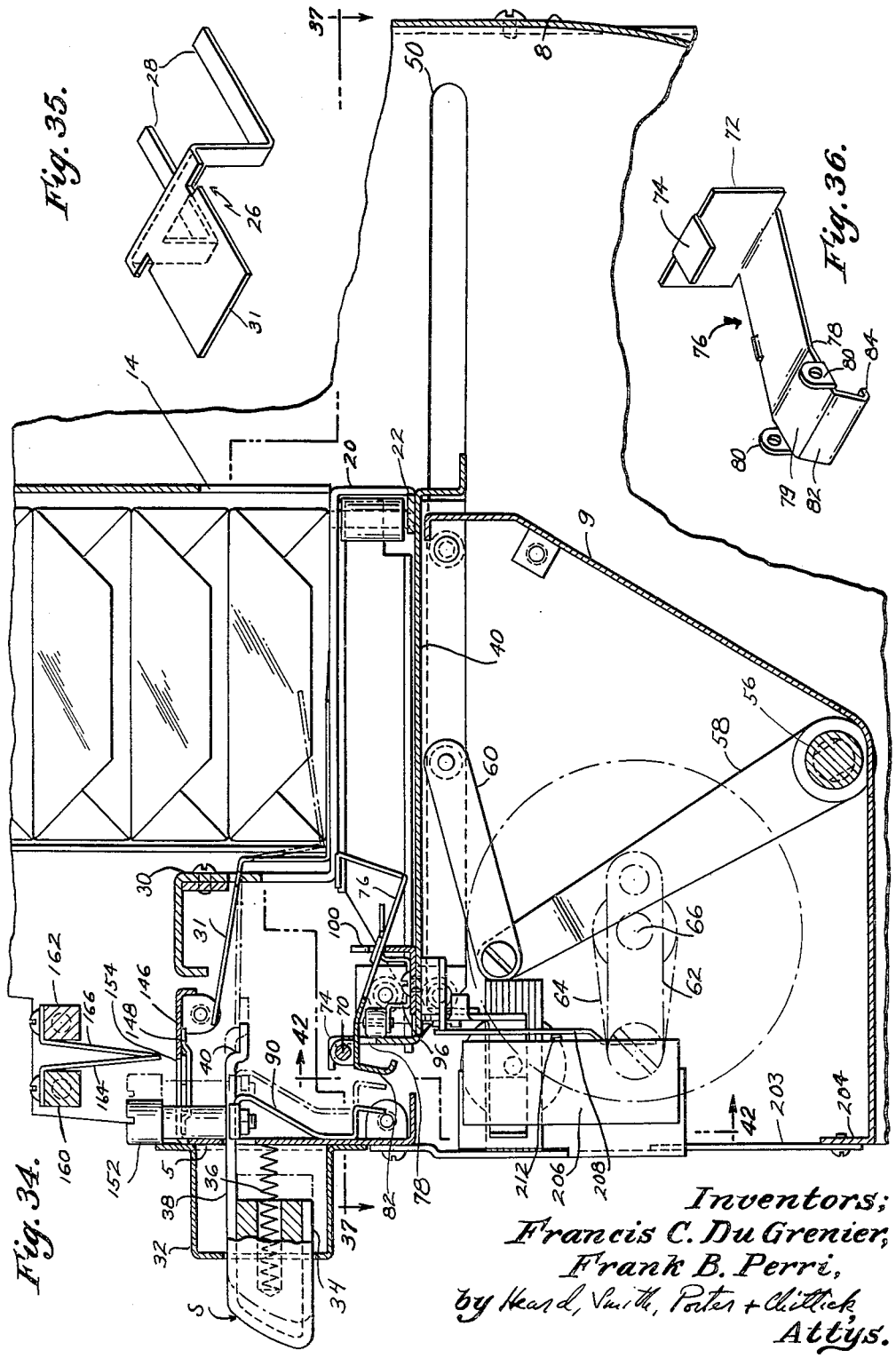

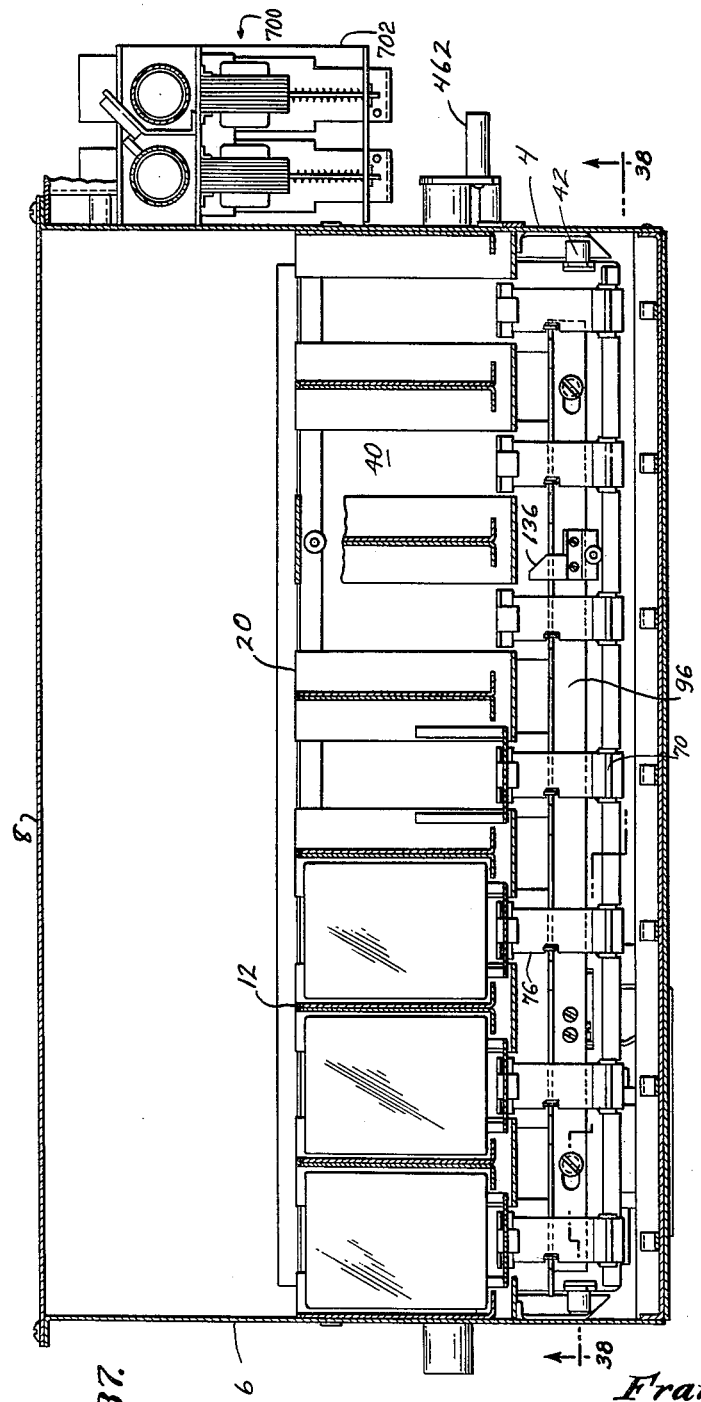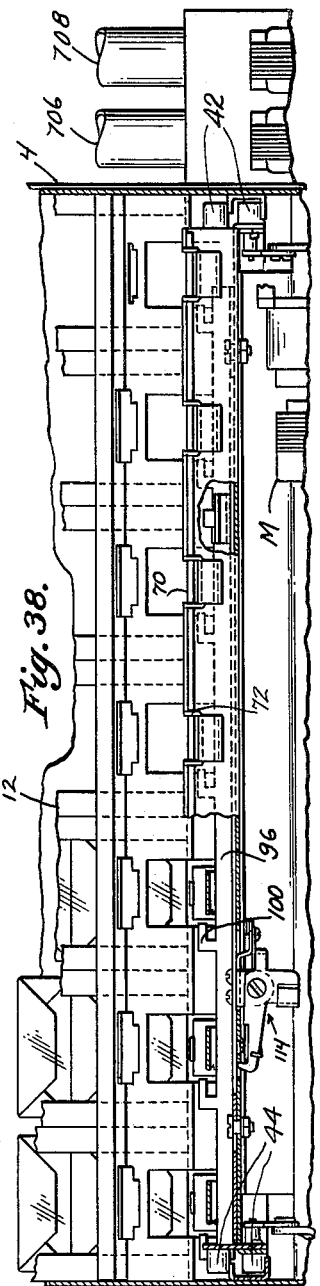

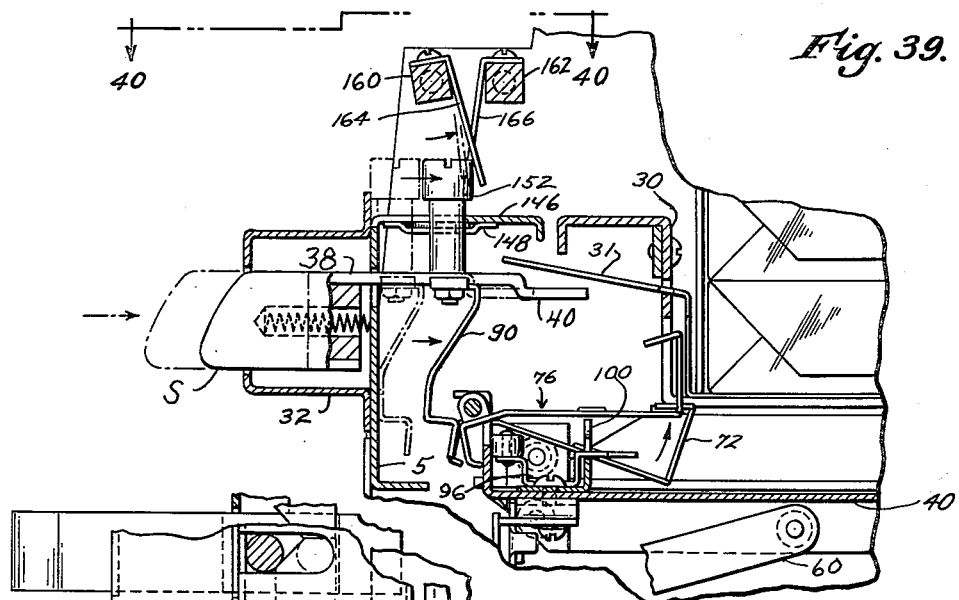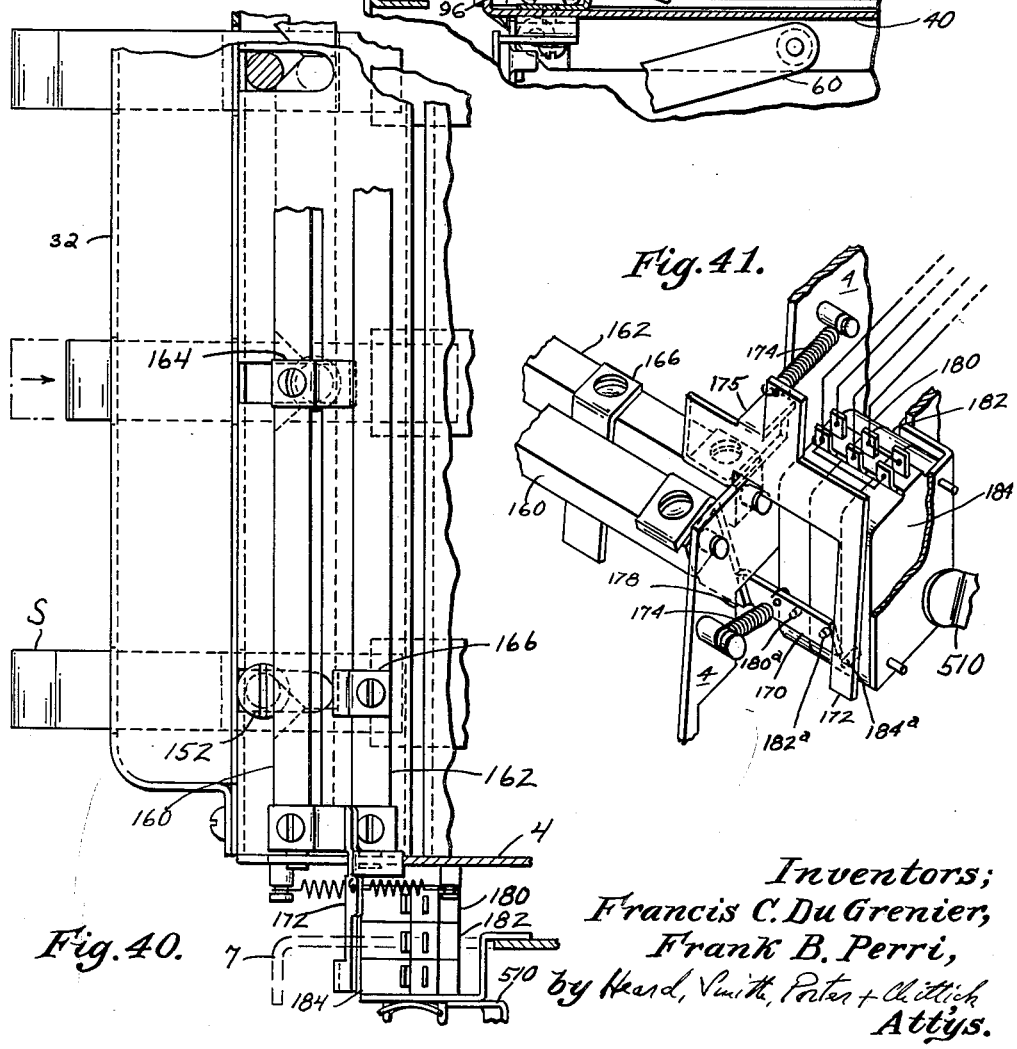

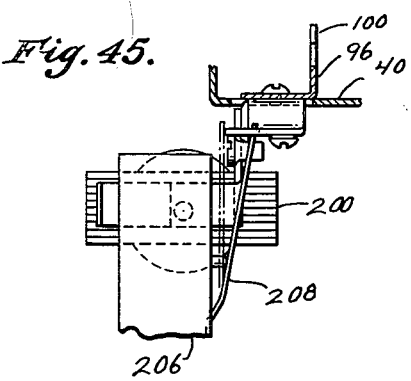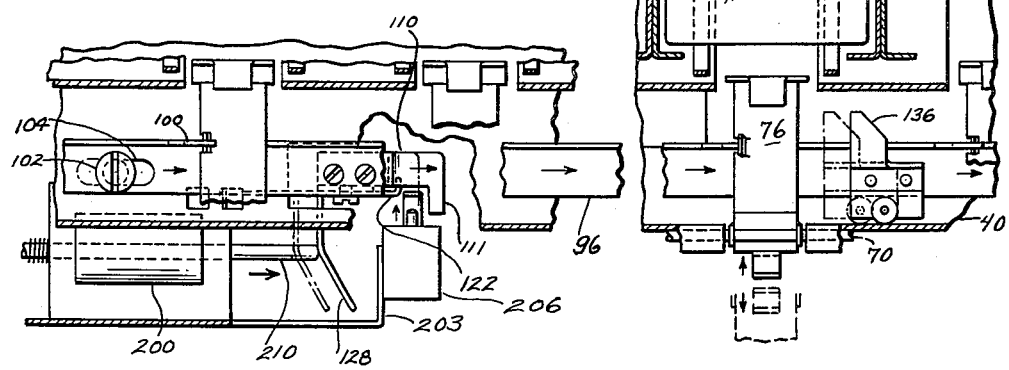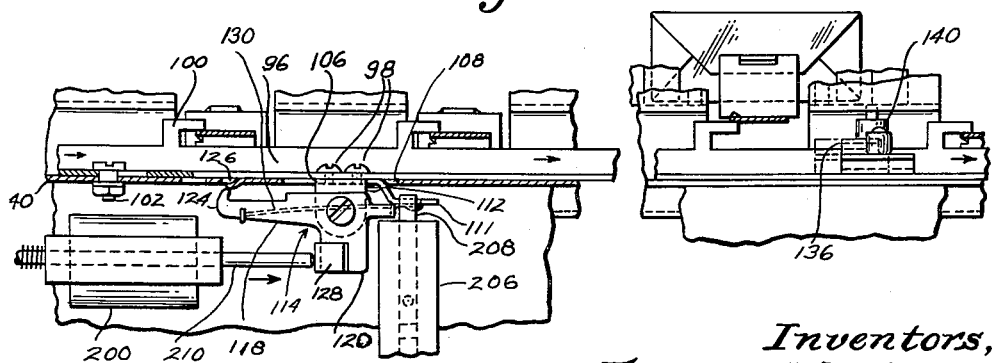

Inventors;
Francis C. Du Grenier,
Frank B. Perri,
by Heard, Smith, Porter + Chittick
Attys.

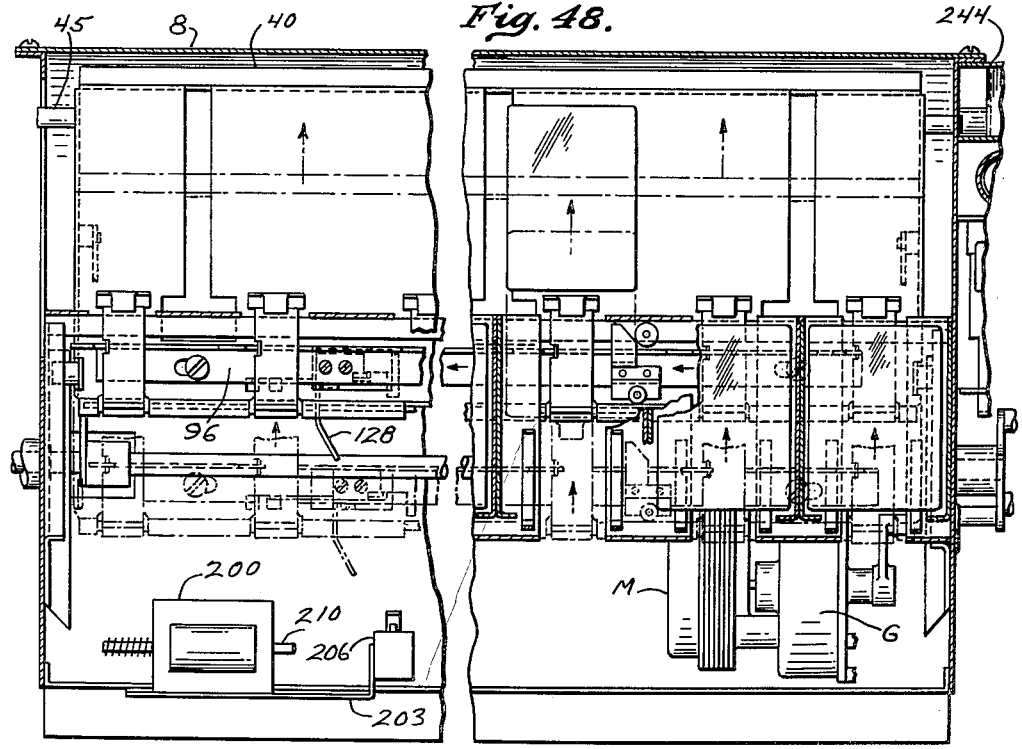
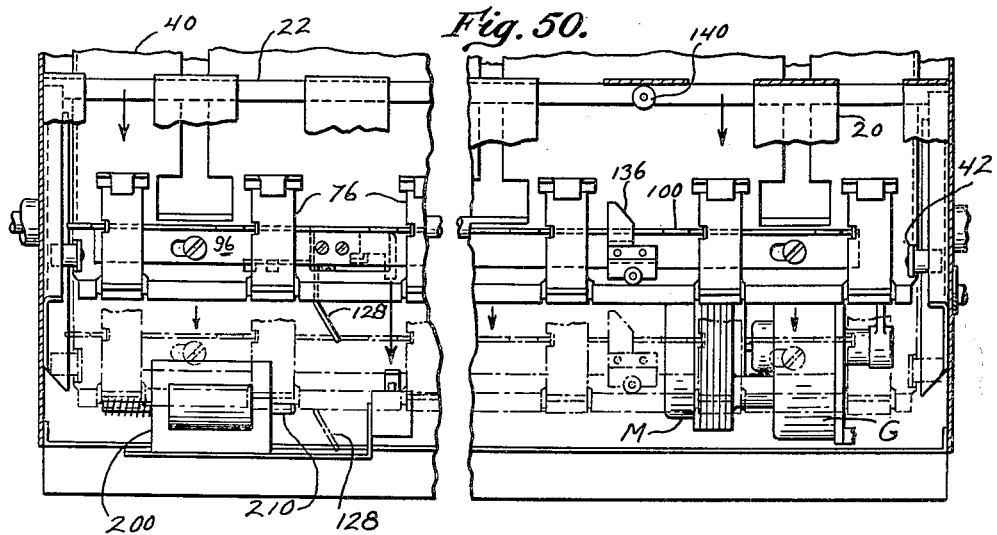

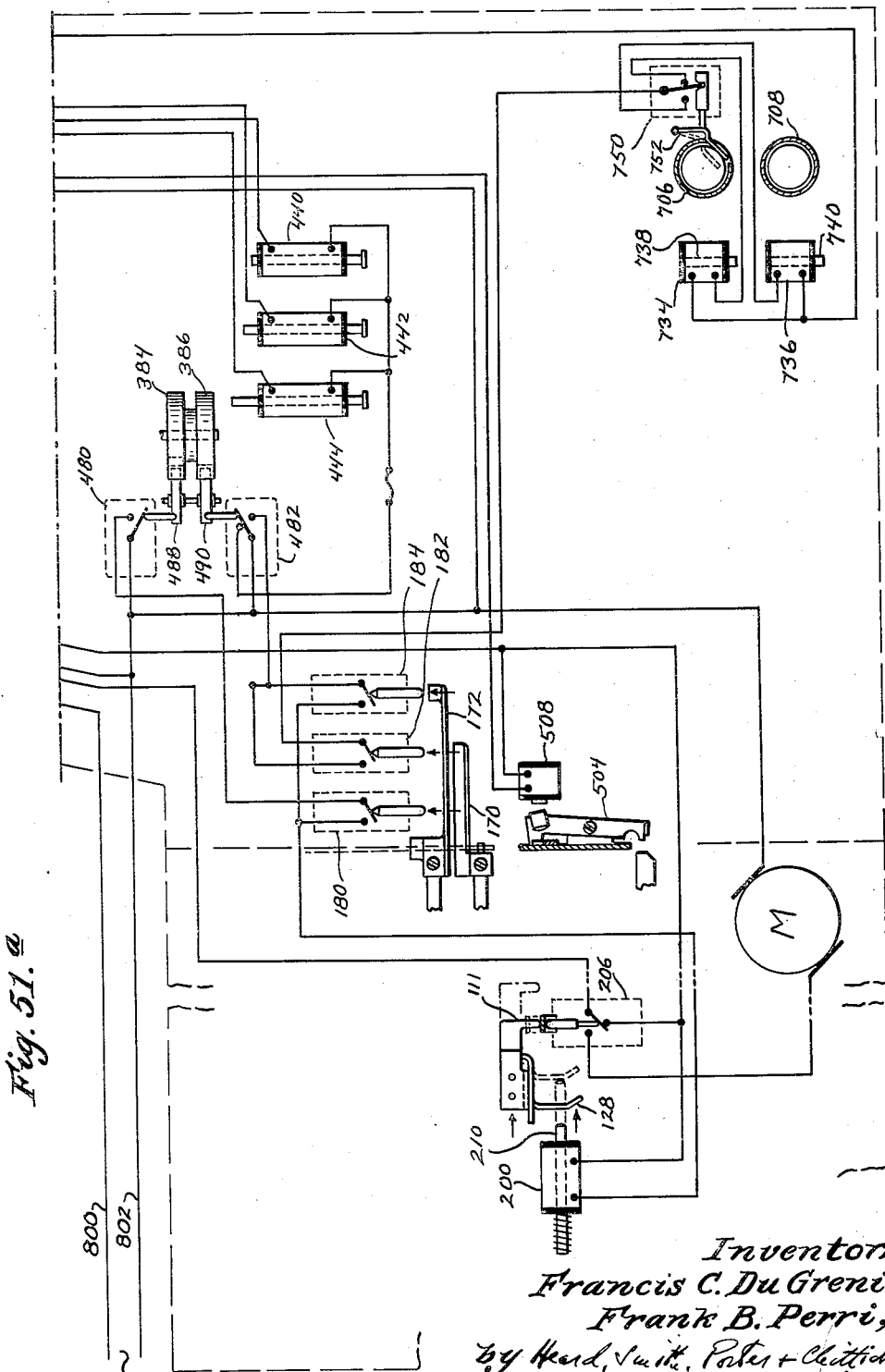

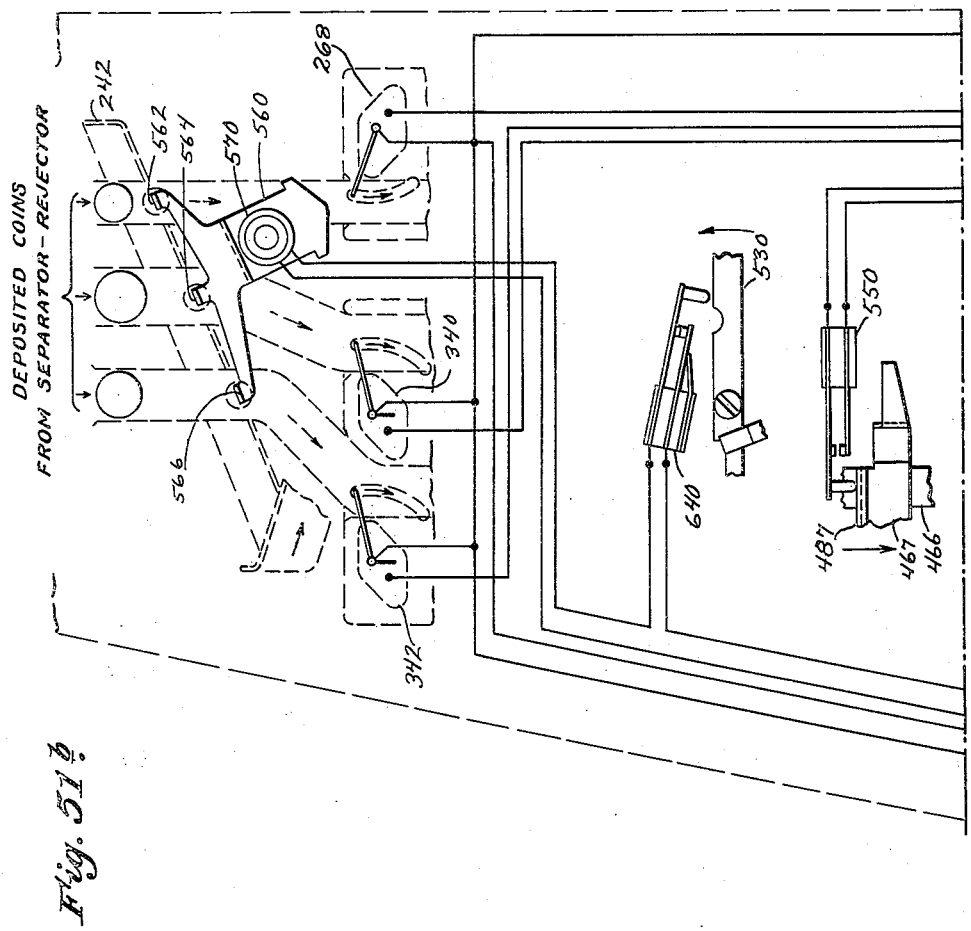

2,973,075
Patented Feb. 28, 1961

2,973,075

ELECTRIC VENDING MACHINES

Francis C. Du Grenier, 15 Hale St., Haverhill, and Frank B. Perri, Groveland, Mass.; said Perri assignor to Blanche E. Bouchard, Haverhill, Mass.

Filed Feb. 18, 1954, Ser. No. 411,109

8 Claims. (Cl. 194—10)

This invention relates to an electric vending machine, which on the insertion of proper coins, and pushing a proper selector button, will dispense a selected article through the electrically operated mechanism.

For purposes of illustration the machine is disclosed and described herein as designed for vending packages of cigarettes, but it will be understood that the machine may be readily adapted to vend other articles, to be sold at two different prices ranging from 5 to 35 cents, such as 5 and 10 cents, 10 and 15 cents, and the like.

For cigarette vending, and again by way of illustration, the machine is here shown as designed specifically to dispense cigarettes in package form of two different values, 20 and 25 cents, on the insertion of coins of three different values, nickels, dimes or a quarter, and for any combination of nickels and dimes. One feature of the machine, which greatly increases its utility is that a changemaker is provided in the machine, whereby the customer may obtain a 20¢ package of cigarettes on the insertion of a quarter, and the machine will return a nickel change to him. It is thus not necessary for the customer to have the exact change to obtain a 20¢ package of cigarettes. Surplus coins are automatically returned by the machine. Pennies may also be returned in change by the changemaker, when added to the machine, but since pennies are not normally used in operating the machine a service problem of supplying sufficient pennies for change-making arises, and it is usually more practical to return penny change by enclosing it with the cigarette package under the cellophane wrapper.

This application is a continuation-in-part of our co-pending application Serial No. 140,464, filed January 25, 1950 for Electric Vending Machine, now abandoned.

Briefly, this vending machine is of the vertical columns-in-line type, having a plurality of vertical columns in which different brands of merchandise of two different values are contained. In this instance, the merchandise comprises packages of cigarettes having, for example, two different values, 20¢ and 25¢. Each vertical column has its own package ejector, its own selector button and a common delivery chute. A common operating slide which constitutes a delivery tray, and which extends horizontally across the machine and carries the package ejectors, is caused to move rearwardly under the cigarette columns, ejecting the lowermost package from the selected column, and is then returned forwardly to its original operating position. The machine is electrically operated through a suitable source of electric current which energizes an electric motor and through intervening mechanism causes the operating slide to reciprocate one complete stroke. This is accomplished when the purchaser inserts the proper coins (or coin), which pass through a coin counter where they are evaluated or counted, and in turn actuate a coin totalizer which sets the circuit according to the value of the coins inserted, e.g. 20¢ or 25¢. The purchaser then presses the selector button in the desired column, which closes the remaining circuit required to operate the machine and thus completes the vending operation. Two price-change bars for 20¢ and 25¢ respectively constitute a setting mechanism, so that for the selected column of cigarettes the machine cannot be operated unless the proper coins or coin required for the particular column have been inserted. Tabs on the price change bars are adjustable so that any column may be arranged to provide 20¢ or 25¢ cigarettes, as desired.

New and novel features and advantages of the present machine lie in the provision of:

(1) Separate high and low price-change bars;

(2) A locking bar that locks the package ejector into locking position, making it unnecessary to lock in the selector button and holding the ejector in locked position until the beginning of the return stroke of the operating slide;

(3) An operating slide constituting a movable platform on to which the cigarette packages are dropped, thus insuring uniform delivery of the packages;

(4) A coin return mechanism that is locked and cannot be operated when the vending operation has been started or when the power supply is cut off, thus making it impossible for the operator to get both his package and his money back and thus to defraud the machine;

(5) A coin cut-off which operates when the power supply is cut off to automatically return any coins inserted thereafter without passing them through the coin totalizer;

(6) A change maker having two coin columns, one of which is adapted to be manually filled, and the other of which is adapted to be automatically filled during the operation of the machine, means being provided for automatically converting to the manually filled coin column when the automatically filled coin column is empty.

Before explaining in detail the present invention it is to be understood that the invention is not limited in its application to the details of construction and arrangement of parts illustrated in the accompanying drawings, since the invention is capable of other embodiments and of being practiced or carried out in various ways. It is also to be understood that the phraseology or terminology employed herein is for the purpose of description and not of limitation and it is not intended to limit the invention claimed herein beyond the requirements of the prior art.

Other objects and many of the attendant features and advantages of the invention appear in the following specification and accompanying drawings, in which:

Fig. 1 is a front elevation of the assembled machine;

Fig. 2 is a plan section taken on line 2—2 of Fig. 1;

Fig. 3 is a right end elevation of Fig. 1, taken as shown by view lines 3—3 on Fig. 1 (view lines are not intended to denote a section);

Fig. 4 is an elevation similar to Fig. 3, but with the coin mechanism mounting panel removed, taken along view lines 4—4 on Fig. 1;

Fig. 5 is a reverse view of the detached coin mechanism mounting panel shown in Fig. 4 and is taken as shown by view lines 5—5 on Fig. 1;

Fig. 6 is a rear edge view of the coin platform, the coin gate, and the coin-receiving castings, the assembly being taken as shown by view line 6—6 on Fig. 3;

Fig. 7 is a perspective detail of the coin platform with a fragment of its operating member;

Fig. 8 is a section taken on line 8—8 on Fig. 6, and is taken from the inside face of the coin mechanism mounted panel in order to indicate the path of dimes received from the coin detector and separator unit and their deposition when the manual return mechanism is operated;

Fig. 9 is a section similar to the section of Fig. 8, but indicating the path followed by dimes in the dime-receiving casting to the coin box;

Fig. 10 is a section taken on line 10—10 on Fig. 6, and is taken from the outside face of the coin mechanism mounting panel to indicate the paths of quarters and nickels from the coin detector and separator unit when the manual return lever is operated;

Fig. 11 is a section similar to Fig. 10, but indicating the paths of quarters and nickels to the coin box when accepted for delivery of the selected item;

Fig. 12 is a vertical section taken on line 12—12 on Fig. 11 showing in detail the path of a quarter en route to a coin box;

Fig. 13 is a perspective detail assembly of the coin gate, the coin returning pins and the gate-operating bar;

Fig. 14 is a perspective detail assembly of a combination lock mechanism for both the coin return lever and the selector locking bars;

Fig. 18 is an elevation view of the coin counting and totalizing mechanism which is mounted on the outside of the coin mechanism mounting panel;

Fig. 19 is a plan view of Fig. 18 including certain parts associated with the coin counting and totalizing mechanism;

Fig. 20 is a vertical section taken on line 20—20 on Fig. 18;

Fig. 21 is a section taken on line 21—21 on Fig. 18;

Fig. 22 is a fragmentary section taken on line 22—22 on Fig. 19; showing the operation of the pawl and the coin counting solenoids;

Fig. 22a is a fragmentary detail elevation of the totalizer cam showing the positions of its related parts when the low price total is deposited in the machine;

Fig. 22b is a figure similar to Fig. 22a, but with the ratchet wheel advanced one notch and showing the position of the totalizer elements when the high price total is deposited in the machine;

Fig. 23 is a section taken on line 23—23 on Fig. 22a;

Fig. 24 is a detail view of the totalizer cam indicating how the machine can be adjusted for different prices;

Fig. 25 is a section similar to Fig. 23 showing how the desired price range is set;

Fig. 26 is a front elevation of the change maker assembly as mounted on the right hand machine panel;

Fig. 26a is a fragmentary detail of the upper part of Fig. 26 showing how nickels automatically spill over into the coin box chute when the automatic nickel tube is full;

Fig. 27 is a plan sectional view taken on line 27—27 on Fig. 26;

Fig. 28 is a perspective detail of the nickel ejector slide of the change maker;

Fig. 29 is a vertical sectional taken on line 29—29 on Fig. 27 showing the parts of the change maker in normal position, broken lines indicating the position of the nickel ejector slide when released;

Fig. 30 is a fragmentary plan section taken on line 30—30 on Fig. 29;

Fig. 31 is a fragmentary detail section similar to that of Fig. 29, showing the coin being released from the change maker and illustrating how the coin release slide is re-set;

Fig. 32 is a fragmentary sectional view taken on line 32—32 on Fig. 27, showing operation of the switch associated with the change maker for shifting from the manually filled to the automatically filled coin tube of the change maker;

Fig. 33 is a circuit diagram for the change maker unit;

Fig. 34 is a vertical section taken on line 34—34 on Fig. 1, through the selector mechanism, the ejector mechanism and the delivery platform in their normal position prior to selection, the broken lines indicating how the selector locking leaf operates to prevent selection when the merchandise column is empty;

Fig. 35 is a detail perspective of an individual selector locking leaf;

Fig. 36 is a detail perspective of an individual package ejector;

Fig. 37 is a plan sectional view taken on line 37—37 on Fig. 34;

Fig. 38 is a front section taken on line 38—38 on Fig. 37;

Fig. 39 is a fragmentary sectional view similar to Fig. 34 indicating the relationship of the various parts when a low price package selector button has been pressed;

Fig. 40 is a fragmentary plan sectional view taken on line 40—40 on Fig. 39 showing the resulting action of the price bar and its associated tab;

Fig. 41 is a perspective view of the switches actuated by tilting of the high and low price bars;

Fig. 44 is a front section similar to Fig. 42 but showing the positions of the various parts after the ejector locking bar has been moved through action of the motor control solenoid;

Fig. 45 is a fragmentary detail section showing the movement of the motor control lever and illustrating how the motor control switch is released to initiate operation of the mtor;

Fig. 46 is a fragmentary plan section based on Fig. 43, but with parts in position as shown in Fig. 44;

Fig. 48 is a plan sectional view taken on line 48—48 on Fig. 47;

Fig. 50 is a plan sectional view taken on line 50—50 on Fig. 49 based on Fig. 48 but with parts broken away and position of the elements being the same as shown in Fig. 49;

Fig. 51a is the lower half of the diagram of the complete circuit of the machine;

Fig. 51b is the upper half of the diagram of the complete circuit of the machine.

Figure 15:
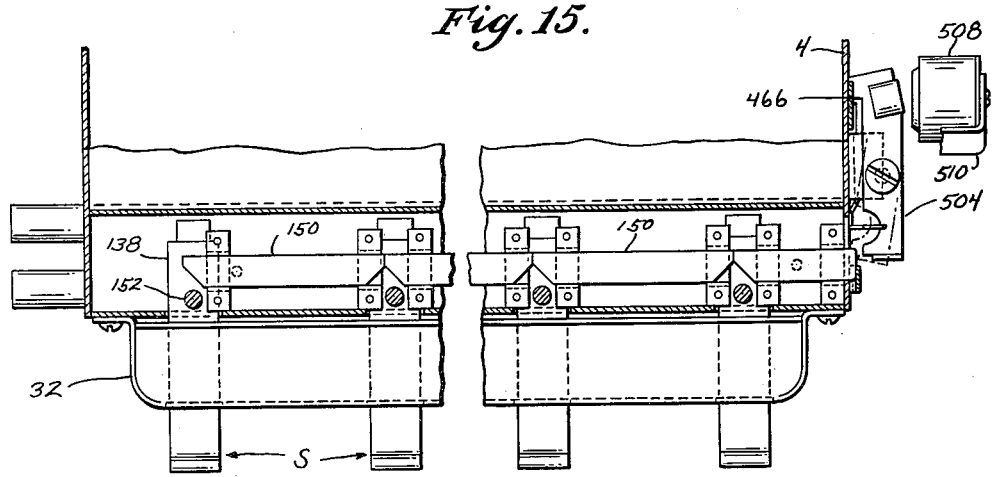
Fig. 15 is a fragmentary horizontal section taken on line 15—15 on Fig. 4, showing the normal position of the combination lock and its associated parts, details of the package ejector being omitted for clearness.
Figure 17:
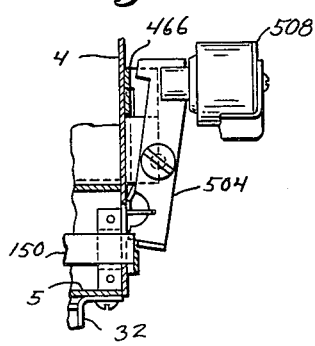
Fig. 17 is a view similar to Fig. 16, but with the selector bars locked and the coint return bar unlocked.

As shown in the drawings the operating mechanism of the vending machine is mounted in a frame comprising a right side panel 4, a left side panel 6, a narrow front panel 5, a curved bottom and back panel 8, and an inner curved panel 9. These frame members are best seen in Figs. 1, 2, 3, 4, and 5. Panels 8 and 9 together define a delivery chute for merchandise contained in the machine. A plurality of vertical compartments 10 extending horizontally across the machine are defined by vertical channel members 12 (Figs. 1, 2, and 4). An opening 14 is provided at the bottom of each vertical compartment through which the packages are removed by means hereinafter described. This opening is best seen in Figs. 4 and 34. Mounted below compartments 10 and forming the bottom thereof is a fixed platform comprising spaced parallel sections 20 which are fixedly secured by horizontal bar 22 supported from side panels 4 and 6. The forward ends of sections 20 are integral with upstanding member 30 extending horizontally between panels 4 and 6. The compartments 10 are usually of equal width and evenly spaced apart, and take a column of cigarette packages packed flat-wise. However, it is to be understood that each compartment may be divided in two parts vertically, each part to take a column of cigarette packages lying edgewise.

Pivotally mounted in member 30 are a plurality of selector button stop members 26 whose construction is as shown in Fig. 35. Fingers 28 of stop members 26 extend out over the top of platform sections 20 as shown in Fig. 2, and their tab portions 31 extend back through openings in horizontal member 30.

Mounted on narrow front panel 5 is a selector button housing 32 which carries selector buttons S, as shown in Figs. 1 and 2. Each button S is mounted for reciprocal in-and-out movement and comprises a horizontal plunger 34 guided by openings in housing 32 and held in an outward position by compression springs 36, (Fig. 34). Extending inwardly of the machine from plunger 34 of each button S is a lug 38 which has an offset lip 40 which when the button is pushed slides under tab 31 of stop member 26 when fingers 28 of stop 26 are held down by one or more packs of cigarettes. However, when the vertical column above stop 26 is empty, the tab portion of stop 26 strikes lug 38 extending from plunger 34 and prevents the selector button S from being pushed in a distance sufficient to actuate mechanism hereinafter described.

A main operating slide or tray 40 extending horizontally between side panels 4 and 6 is movably mounted beneath the vertical columns for reciprocating movement forwardly and rearwardly by pairs of rollers 42 and 44 (see Figs. 2, 4, 37 and 38) which ride over guide rails 48 secured to side panels 4 and 6 and by additional rollers 45 mounted in slots 50 of each side panel (Figs. 2, 4, 34, 37 and 38).

Below slide 40 is an electric motor M and a gear reduction unit G supported by arms 52 to side panel 4 as shown in Figs. 1, 4 and 48. Extending through side panels 4 and 6 is a horizontal oscillating shaft 56 having fixedly secured thereto a lever 58 which in turn is pivotally secured at its other end to a smaller lever 60. Lever 60 is pivotally secured to slide 40. Connected to gear 58 is a link 62 which is pivotally secured to crank arm 64 carried by rotating shaft 66 of gear reduction unit G. By construction one full revolution of shaft 66 causes slide 40 to travel backwardly and then forwardly to its original starting position to make delivery of one package.

Pivotally secured on a rod 70 passing through eyes 72 in the front upstanding wall 73 of slide 40 are ejectors 76 which rest in slots 75 provided in wall 74 (see Figs. 2, 34, 37 and 38).

The configuration of ejectors 76 is illustrated in Fig. 36. These ejectors when swung upwardly about their pivoted end operate to eject the bottom package in the column of cigarettes above the ejector when tray 40 moves toward the rear of the machine. Each ejector 76 carries at its front end an upwardly extending arm 72 preferably having a lug portion 74 extending rearwardly as seen in Fig. 36. The purpose of lug 74 is to provide a flat surface upon which the package immediately above the package being ejected can fall without being torn or creased as would be the case if arm 72 did not have lug portion 74. The rear end of ejector 76 is bent slightly at 78 and its minor bent portion 79 has perforated ears 80 to receive rod 70. Carried by the minor bent portion 79 is a downwardly extending arm 82 which in turn has an inwardly extending lip 84.

Depending from lug 38 of selector buttons S and carried forward with lug 38 when button S is manually depressed is a spring member 90 so located that it will come into contact with arm 82 and tilt ejector 76 upwardly about its pivotal point to bring it into position between parallel sections 20 to effect a pack as illustrated in Fig. 39. Lip 84 limits the upward travel of ejector 76.

Mounted at the front of slide 40 is an ejector locking bar 96, views of which are presented in Figs. 2, 34, 37 to 39, 42 to 44, 46, 48 and 50. Ejector locking bar 96 has an upwardly extending rear side 98 provided with hooked fingers 100 spaced from each other proximate to ejectors 76 as seen in Figs. 44 and 46. Locking bar 96 is mounted for horizontal movement sidewise by means of vertical pins or studs 102 extending through longitudinal slots 104.

Means for moving locking bar 96 sidewise includes a bracket 106 mounted on the under side of locking bar 96 by screws 98. An opening 108 is provided in slide 40 to accommodate bracket 106. Bracket 106 has a downwardly extending lug 112 and an offset portion 110 provided with a lug 111. Lug 112 carries a lever 114 pivoted at 116 and comprising three arms 118, 120 and 122, extending to the left downwardly and to the right respectively. Arm 118 is provided with a hook 124 extending up into an aperture or notch 126 in slide 40. Arm 120 carries a contact finger 128 and arm 122 is bent toward the back of the machine under offset portion 110 of bracket 106. A wire spring 130 is mounted at one end to offset portion 110 and is hooked at its other end laterally under arm 118, tending to hold arm 118 upwardly with hooked end 125 releasably engaging aperture 126 in slide 40, whereby the ejector locking bar 96 is normally locked against sidewise horizontal movement.

When ejector locking bar 96 is moved to the right by mechanism to be hereinafter explained, hooked finger 100 moves under the ejector raised by a depressed selector button and over all the other ejectors, thereby keeping the selected ejector in a raised operative position and the other ejectors in a lowered inoperative position so that only the package in the compartment corresponding to the raised ejector can be pushed outward to the delivery chute.

Also carried by ejector locking bar 96 is a cam plate 136 (Fig. 46) which cooperates with a vertical roller 140 mounted on bar 22 beneath a section 20 (Figs. 2, 37, 43, 46, 48, 49 and 50). As slide 40 reaches the end of its rearward or delivery stroke, cam plate 136 strikes roller 140 and locking bar 96 is thereby moved toward the left side of the machine to its original position. This assures that no ejectors can remain locked in ejection position on the return stroke of slide 40 to tear or otherwise damage the bottom package of cigarettes.

As seen in Figs. 1 and 42 through 50, the mechanism for moving the ejector locking bar 96 to the right to lock ejectors 76 comprise a solenoid 200 mounted on a vertical bracket 203 secured between front panel 5 and the upturned lip 204 of inner panel 9. Mounted on the same bracket is a motor actuating switch 206 carrying a vertically extending leaf spring contact 208 which is normally engaged by lug 111 of bracket 106. Motor switch 206 is a single pole double throw switch which is connected as explained hereinafter to motor M. When leaf contact arm 208 of switch 206 is engaged by lug 111, the switch is in open position with respect to motor M and closed with respect to other electrical elements to be hereinafter described. This situation exists when the machine is stationary ready for the insertion of a coin, the delivery slide being in its extreme forward position so that lug 111 is in contact with leaf spring 208. When solenoid 200 is energized by the completion of the proper electrical circuit to be described hereinafter, its armature 210 is moved to the right and engages contact finger 128 on arm 120 of pivoted lever 114, pushing it to the right, disengaging hook 124 and moving lever 114, bracket 106 and ejector locking bar 96 to the right. This causes lug 111 to become disengaged from leaf spring 208 and the switch means becomes closed to motor M but open to the other electrical elements hereinafter described to which it was previously closed. Motor M then operates to move delivery slide 40 as previously described. On the return stroke ejector locking bar 96 is cammed to the left by means of cam roller 140 which engages cam plate 136 previously described. Lug 111 on bracket 106 again engages leaf spring 208 to push in pin 212 of switch 206 to stop motor M.

Figure 16:
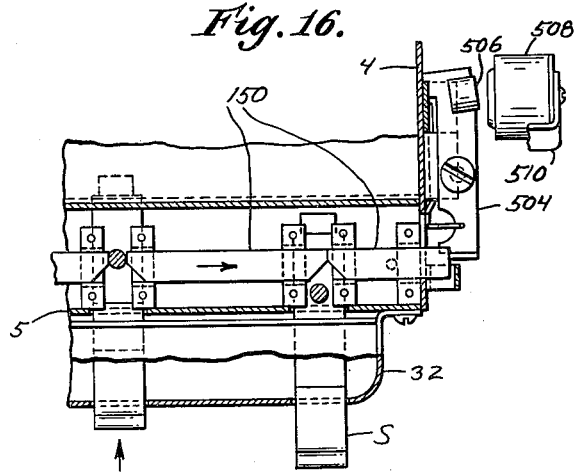
Fig. 16 is a view similar to Fig. 15 but illustrating the selector in a depressed position and the coin return bar in locked position.
Figure 43:
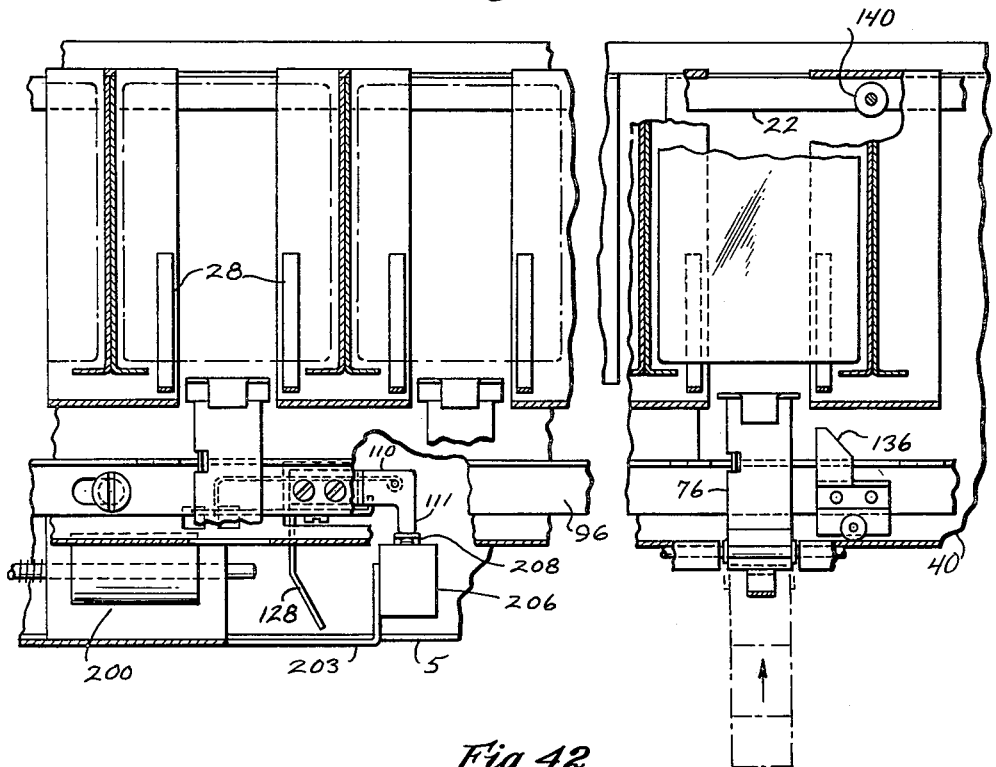
Fig. 43 is a plan section taken on line 43—43 on Fig. 42.
Figure 42:
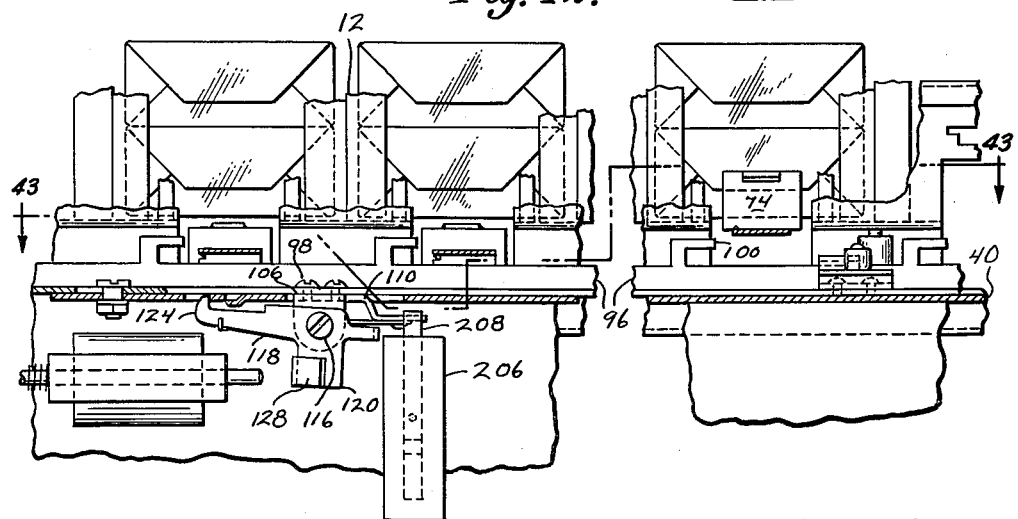
Fig. 42 is a fragmentary front section taken on line 42—42 on Fig. 34, showing an ejector element in a raised position prior to operation of the ejector lock and release of the motor controlled switch by action of the motor control solenoid.
Figure 47:
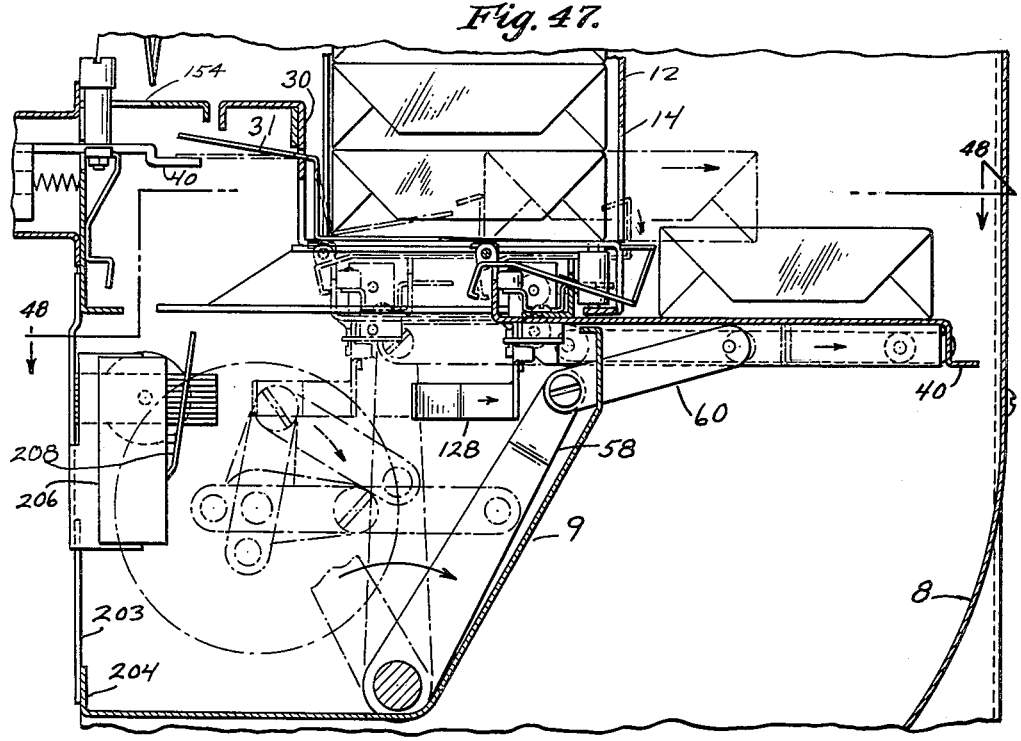
Fig. 47 is a vertical section similar to Fig. 34 showing how delivery of the merchandise from the column to the platform is effected.
Figure 49:
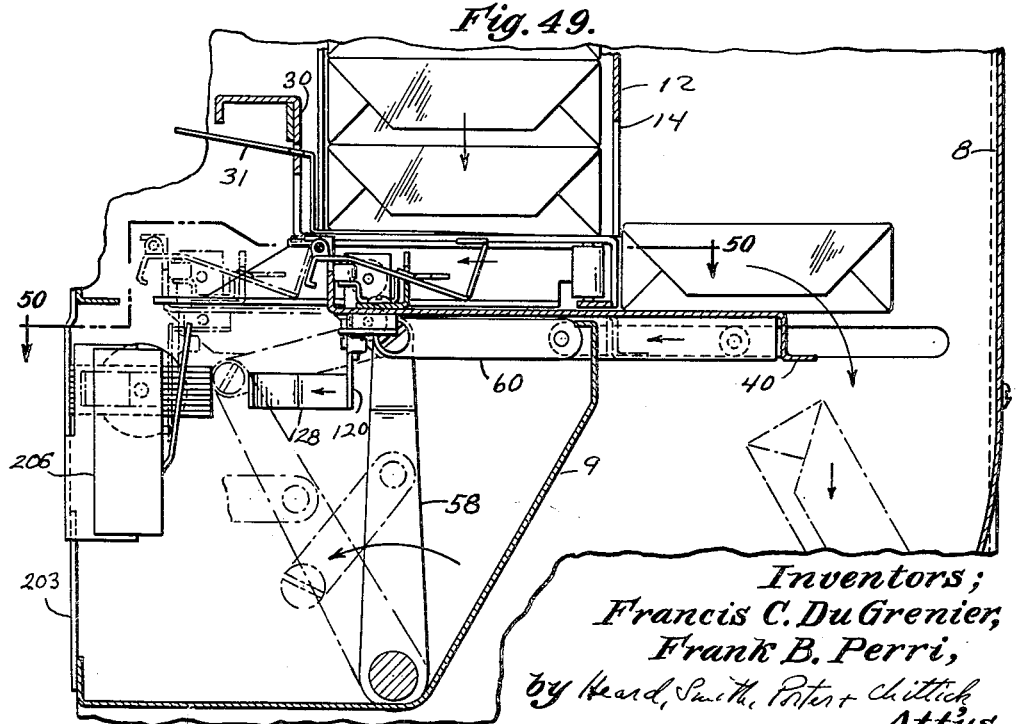
Fig. 49 is a vertical sectional view similar to that of Fig. 47 but indicating the reurn stroke of the platform and illustrating release of the merchandise to the customer via the delivery chute.

Suitable mechanism is provided to prevent more than one selector button from being depressed at a time. Various views of this mechanism are presented in Figs. 2, 15, 16, 34, 39 and 40. As seen in Figs. 34, 39 and 40 a flat plate-like member 146 is disposed perpendicular to and preferably integral with front panel member 5. Secured to this member 146 on its bottom surface is a channel bar 148. Slidably contained within the channel formed between plate 146 and bar 148 are a series of flat sections 150 whose adjacent corners are beveled as shown in Figs. 15 and 16. Mounted on lugs 38 of selector button plungers 34 are upstanding studs 152 which extend through elongated slots 154 in plate 146 and box 148. Slots 154 run parallel to side panels 4 and 6 so as to permit the selector buttons to be depressed inwardly.

As seen in Figs. 2, 15 and 16, for example, studs 152 reside in the spaces provided by the beveled corners of sections 150, which are so arranged that when a selector button is pushed in the stud carried by the particular selector button separates the two sections 150 immediately adjacent the particular stud. The space for lateral movement being limited, this prevents any other selector button from being simultaneously operated.

Above the selector button assembly are two horizontal bars identified hereinafter as low price bar 160 and high price bar 162 (see Figs. 1, 2, 34, 39, 40 and 41). These bars extend between side panels 4 and 6 and are pivotally mounted thereon for a tilting or swinging movement about their longitudinal axes.

Price tabs or lugs 164 and 166 are hung on bars 160 and 162 respectively in line with studs 152 which are of sufficient height to strike tabs 164 or 166, as the case may be, and to thereby tilt the price bar from which the tab depends. Thus assuming the machine is loaded with cigarettes of price 20¢ in one or more vertical compartments and cigarettes of price 25¢ in the other vertical compartments, tabs 164 are mounted on bar 160 in front of the compartments containing 20¢ packages and tabs 166 are mounted on bar 162 in front of those compartments containing 25¢ packages. Then when a selector button in front of a 20¢ column is depressed, its stud 152 strikes a tab 164 and thereby swings the low price bar 160. Similarly when a button in front of a vertical column containing 25¢ packages is pressed, its stud 152 strikes a tab 166 and swings the high price bar 162.

Carried on the right hand ends of bars 160 and 162 are contact fingers 170 and 172. Secured between each contact finger and side panel 4 are tension springs 174 which tend to keep fingers 170 and 172 away from switches 180, 182 and 184. Contact finger 170 extends through a hole 176 in panel 4 and rests against the outer edge 178 of the hole. Upper finger 172 has an inwardly extending portion 175 that abuts the outer edge of panel 4 when urged by spring 174.

Mounted on the outside of panel 4 are three switches 180, 182 and 184 placed side by side. The innermost switch 180 is identified hereinafter as the low price bar switch; the intermediated switch 182, the change maker switch; and the outer switch 184, the high price bar switch. These switches have contact pins 180a, 182a, and 184a, respectively. These switches are normally open, and when bars 160 and 162 are tilted, finger 170 contacts pins 180a, and 182a, and finger 172 contacts pin 184a, pushing them inwardly to close the switches. One or the other of switches 180 and 184 must be closed in order for the machine to deliver merchandise. Closing of change maker switch 182 completes the necessary circuit to operate the Change Maker to be hereinafter described, so that a nickel will be released if 25¢ has been deposited in the machine but a 20¢ selector button depressed.

Coin controlled mechanism

The mechanism which counts the coins inserted in the machine, determines their value, totalizes them and sets the machine for operation according to the number and value of the coins will now be described. Various views and details of this mechanism are illustrated in Figs. 1, 3, 5 through 14 and 18 through 25. Most of this mechanism is mounted on a separate and removable panel 7 mounted on the exterior side of right side panel 4. The latter side panel also carries other mechanical elements described hereinafter which cooperate with the mechanism mounted on removable panel 7.

The means for mounting panel 7 on panel 4 includes a small apertured bracket 220 on panel 4 which receives a pin 222 on the bottom edge of panel 7 and a second bracket 224 on panel 4 (Fig. 4) having a side opening which receives a second pin 226 at the top of panel 7. A suitable thumb screw 230 passes through hole 232 in panel 7 and screws into a tapped cylindrical extension 234 of panel 4. By removing thumb screw 230, panel 7 can be swung outwardly about the pivot points provided by pins 222 and 226 and brackets 220 and 224.

Mounted at the top of panel 7 is a conventional coin detector and rejector unit 40. Details of unit 240 need not be described or illustrated since such units are old and well known. It is sufficient to know that the coin detector and rejector unit 240 is provided with a flared hopper 241 which is normally positioned below a chute (not shown) that delivers to it coins inserted for the purchase of merchanise contained within the machine, and that the coins inserted within unit 240 are subjected to a series of tests for size, weight, magnetism and the like for the purpose of detecting spurious coins and ejecting them from the machine. The coins found acceptable are passed out of the bottom of unit 240 and delivered to the coin controlled mechanism to be hereinafter described. The coins found unacceptable are delivered out of the unit to a chute 242 (Fig. 4) mounted on the exterior side of panel 4 which communicates with coin return chute 244 (Fig. 2) which communicates with an opening 246 in panel 4. Coins passing through opening 246 fall into the delivery chute at the bottom of the machine and are returned at the bottom of the chute to the customer.

Mounted on the inner side of panel 7 is a casting 250 having depressions therein which form coin channels between casting 250 and panel 7. A second casting 280 is counted on the opposite face of panel 7 and like casting 250 it also has depressions which form coin channels between it and panel 7. Figs. 3, 5, 6 and 8 through 12 illustrate this section of the machine.

Casting 250 (Figs. 5, 6, 8 and 9) has an irregular depression 252 which commences at opening 254 and terminates at openings 256 and 258. Casting 250 is slotted at 260 and 262 to accommodate pins 264 and 266 connected to means hereinafter described. Casting 250 receives dimes from the coin detector and rejector unit 240, the dimes entering at opening 254 and being channeled between casting 250 and panel 7 to one or the other of openings 256 and 258. Pins 264 and 266 are slidable vertically in slots 260 and 262, normally resting in the down position as shown in Fig. 8. In the down position upper pin 264 prevents dimes from leaving depression 252 through openings 256, and in the absence of platform 328 hereinafter described, they fall by gravity to the bottom of casing 250 and leave by opening 258. If pin 264 is in the "up" position shown in dotted lines in Fig. 8, dimes pass out of opening 256 when platform 328 rests within casting 250. As will be made clear hereinafter, opening 256 communicates with a coin return chute 307 and opening 258 communicates with a chute 309 leading to a cash box 311 (Fig. 4).

A dime counting switch 268, whose operation relative to other units of the machine will be hereinafter explained, is mounted at the top of casting 250 on the side away from panel 7. Switch 268 has a finger 270 which extends into an arcuate slot 272 located near opening 254 in the path of travel of dimes entering at that opening. Switch 268 is normally open and closes briefly each time its finger 270 is tripped downward under the weight of a dime. The finger is spring loaded to return to its original position when the dime which tripped it has passed beyond slot 272.

Casting 280, mounted on the right hand or outer side of panel 7, is designed to provide in conjunction with panel 7 a plurality of channels through which quarters and nickels may pass. Views of casting 280 are presented in Figs. 3, 6, 10, 11 and 12. Casting 280 has two irregular depressions 282 and 284 defined by rim sections 286, 288, 290 and 292 and intermediate section 294. Depression 282 is reserved for nickels and commences at coin insertion opening 296 and continues down first between intermediate section 294 and rim section 288 and then between intermediate section 294 and rim section 292 toward the rear side of casting 280 where rim section 290 separates depression 282 and causes it to be terminated in two openings 298 and 302 (Fig. 6).

Opening 298 communicates with coin return chute 307 and opening 302 is located above a coin storage tube 706.

Depression 284 is reserved for quarters and commences at coin insertion opening 306 and continues down rearwardly between rim section 286 and intermediate section 294, terminating at opening 308 which communicates with coin return chute 307. As shown in Figs. 11 and 12, casting 280 is provided with an inclined slot 310 cut on a bias and leading from depression 284 on the inner side of the casting to inclined coin channel 312 formed on the outer side of the casting by flat plate 314 mounted on raised section 316 of the casting. A second slot 317 parallel to but longer than inclined slot 310 is also provided in casting 280. Two additional slots 318 and 320 running vertically are provided to receive pins 264 and 266 referred to hereinabove.

As seen in Figs. 3 and 6, casting 280 is provided on the outside with brackets 322 and 324 to which is pivotally connected a plate 326 provided with upper and lower coin platforms 328 and 330. Details of plate 326 and platforms 328 and 330 are illustrated in Fig. 7. When plate 326 is in an upright position upper platform 328 extends through slot 310 and lower platform 330 extends through slot 317. A slot 332 is provided in panel 7 substantially on a level with slot 310 and upper platform 328 is sufficiently wide to extend through slot 332 into the dime channel formed by depression 252 of casting 250, as shown in Fig. 8. When plate 326 is swung outwardly platforms 328 and 330 are removed from slots 310 and 317. Upper platform 328, therefore, when plate 326 is vertical, resides in both the dime channel formed by depression 252 and the quarter channel formed by depression 284, and operates to prevent coins within these channels from dropping vertically through opening 258 and slot 310 to the cash box chute 309. Lower platform 330 normally rests in the nickel channel formed by depression 282 and operates to prevent nickels from dropping vertically to opening 302 leading to tube 706, or to cash box 311 if tube 706 is full. When the platforms are swung out of the coin channels, as illustrated in Fig. 12, the coins are then delivered to the cash box. Platforms 328 and 330 are held in the coin channels by spring 354 secured to the outer surface of casting 280. These platforms are swung out of the coin channels when arm 356 on plate 326 is urged upwardly by lever means hereinafter described and shown in dotted lines Fig. 7.

Secured to the outer surface of casting 280 are quarter and nickel counting switches 340 and 342 respectively, similar in structure and function to dime counting switch 268, and having fingers 344 and 346 which extend through arcuate slots 348 and 350 into the quarter and nickel channels formed by depressions 282 and 284. Switches 340 and 342 close when fingers 344 and 346 are tripped by coins passing through the channels.

Opening 350 provided between rim sections 288 and 292 of casting 280 permits manual loading of nickel tube 706.

Mounted below casting 280 on panel 7 is a coin totalizer assembly 356 (Fig. 3). As seen in Figs. 18 and 19, this assembly comprises a shaft 360 journaled in panel 7 and a bracket 372. Shaft 360 is urged clockwise by spring 374 and restrained from axial movement by removable collar 376 and shoulder 378. Fixedly secured to shaft 360 is a ratchet wheel 380 and a cam actuating disk 382 having a stud 390 mounted adjacent its periphery (Figs. 22, 23 and 24). Removably mounted on shaft 360 is a pair of spaced edge cams 384 and 386 preferably integral with each other, as shown, or otherwise secured to each other. Arcuate notches 392 are provided on the periphery of inner cam 384 to lock both cams at any desired price range. In Figs. 22a, for example, the cams are locked by stud 390 to provide vending of merchandise of either 20¢ or 25¢. Spring 394 and pin 396 cooperate to urge cams 384 and 386 against disk 382, while at the same time permitting the cams to be manually forced away from pin 390 (Fig. 25), so that they may be rotated to another price range if desired. Inner cam 384 is hereinafter referred to as the "low price cam," and outer cam 386 is referred to as the "high price cam." The corner surface 402 of cam 384 is advanced in front of cam surface 404 of cam 386 and, as explained hereinafter, actuates electrical elements associated therewith before corresponding electrical elements can be actuated by corner surface 404.

Loosely mounted on shaft 360 is a lever 406 consisting of two parallel side plates 408 and 410 spaced from each other by a connecting plate 412. Shaft 360 passes through both side plates. Pivotally connected at the end of inner plate 410 is a hooked actuating pawl 414 which is urged toward ratchet wheel 380 by tension spring 416 connected to pin 418 on pawl 414 and to pin 420 on inner plate 410. A second spring 432 secured to pin 434 on panel 7 and pin 420 on inner plate 410 urges lever 406 upwardly so that the hook of pawl 414 can strike pin 434 and be lifted thereby out of contact with the teeth of ratchet wheel 380. Outer plate 408 is provided with lugs 422 and 424 which together with connecting plate 412 act as contact surfaces for the armatures of solenoids 442, 444 and 440 respectively hereinafter described.

A holding pawl 426 is pivotally secured to panel 7 and urged into contact with ratchet wheel 380 by tension spring 428.

Secured to panel 7 below and slightly in back of ratchet wheel 380 by a bracket 430 (Fig. 20) is a battery of three solenoid coils 440, 442 and 444 having armatures 448, 450 and 452 weighted at their bottom ends with disks 454, 456, and 458 respectively. These armatures rest on abutments 460 of horizontal plate 462. A rod 470 is slidably mounted in bracket 430 among solenoids 440, 442 and 444. Rod 470 is weighted at its bottom end by disk 472 and is bent at the top to provide an auxiliary holding pawl 474. Pawl 474 extends through a vertical slot 476 in panel 7. Slot 476 guides pawl 474 and maintains it perpendicular to ratchet wheel 380. One purpose of auxiliary holding pawl 474 is to provide means for preventing ratchet wheel 380 from clockwise movement while one of the solenoids is energized due to the fact that main holding pawl 426 has been accidentally withdrawn from contact with wheel 380 or because spring 428 has been broken or otherwise disconnected.

Mounted on bracket 372 directly in front of cams 384 and 386 are switches 480 and 482 hereinafter referred to as "lo-price totalizer switch 480" and "high price totalizer switch 482" respectively. Switches 480 and 482 are provided with pins 484 and 486 which close switches 480 and 482 when urged or pushed into the switches by switch actuators or levers 488 and 490 respectively. Switch actuators 488 and 490 are pivotally mounted on shaft 492 secured to bracket 372 and normally tend by their own weight to rotate counterclockwise away from pins 484 and 486. The rear ends of actuators 488 and 490 extend under cams 384 and 386. In the machine shown in the drawings which is set up to vend cigarettes at 20¢ and 25¢ per package, as ratchet wheel 380 is rotated four notches, cam disks 384 and 386 rotate similarly and cam 384 engages actuator 488 causing it to swing clockwise to depress pin 484 and close low price totalizer switch 480.

If ratchet wheel 380 is rotated an additional notch, cam disk 386 is caused to engage actuator 490 which depresses pin 486 to close high price totalizer switch 482.

The ratchet wheel is rotated by lever 406 which is urged counterclockwise by armatures 448, 450 or 452, when solenoids 440, 442, or 444 are energized. These solenoids are energized by deposition in the machine of quarters, dimes and nickels respectively. When solenoid 440 is energized its armature 448 moves upwardly to strike connecting plate 412 of lever 406, causing the lever to turn ratchet wheel 380 five notches. When solenoid 442 is energized, its armature moves upwardly to strike lug 422 of lever 406, causing the lever to turn ratchet wheel 380 two notches. Similarly when solenoid 444 is energized its armature moves upwardly to strike lug 424 of lever 406, causing the lever to turn ratchet wheel 380 one notch. Thus for a 25¢ purchase, ratchet wheel 380 is advanced in the same direction and the same number of notches regardless of whether nickels, dimes or quarters are inserted in the machine.

As shown in Figs. 3 and 8 through 11, main operating shaft 56 carries on its right hand end which extends through side panel 4, a bell crank having an arm 460 carrying a pin 462 (which resets the change-maker hereinafter described), and another arm 464 pivotally connected to the lower end of sliding bar 466a, which forms a lower extension of sliding bar 466 (described hereinafter under the coin-return mechanism).

Sliding bar 466a is guided for vertical movement in bracket 468 mounted on panel 4. As described in more detail below, sliding bar 466 carries a bracket 467 having a horizontal arm 470, and as the vending operation is started by pushing in a selector button S (after insertion of proper coins) motor M rocks shaft 56, and through bell crank arm 464, extension bar 466a, sliding bar 466 and arm 470 thereon are moved upwardly. In so doing arm 470 engages and lifts upwardly extending arm 356 of the pivot plate 326 extending through hole 472 (Fig. 5) in panel 7 and tilts the plate, removing coin platforms 328 and 330 from beneath any coins which may be supported on them, allowing the nickels to drop into the change maker and the other nickels into the coin chute to the cash box.

*The coin return machinsm*

Coin return mechanism is provided whereby coins may be returned to the operator at any time before a selector button S is pushed in; also in case a particular stock is empty so that the corresponding selector button cannot be depressed. At the same time the coin return mechanism is inoperable if electric power for operating the machine is cut off, but in that circumstance coins are automatically returned to the purchaser by a coin cut-off mechanism.

The coin return mechanism is mounted on the right side of the machine between side panel 4 and removable panel 7, with operating parts thereof mounted on each panel. The part of the mechanism mounted on the outside of panel 4 is shown in Figs. 4, 8 and 9 while the portion mounted on the inside of removable panel 7 is shown in Fig. 5. As seen in Figs. 4, 8 and 9, the portion of the coin return mechanism mounted on the outside of panel 4 comprises a pivoted lever 476 movable about pivoted pin 478 and tensioned upwardly at all times by spring 480.

Stud 482 limits the upward movement of lever 476, an outwardly extending flange 483 is carried on the left hand end of lever 476, whereby lever 476 may be pushed down manually, flanged end 483 being accessible through a slot in the outer cabinet of the machine (not shown). A downwardly extending rod 484 is pivotally carried on a stud 486 on the left hand end of lever 476, being offset to the left at approximately its middle portion as seen in Fig. 4. At its lower end rod 484 is connected to a horizontal platform 487 of bracket 467 which in turn is rigidly fixed to vertical sliding bar 466. As a safety factor and to permit lever 476 to be depressed its full operating stroke when the mechanism operated by it is not free to be moved, there is provided a coiled spring 490 on the lower end of rod 484 held thereon by collar 492. Bracket 467 carries a rearwardly extending arm 470, which as described above, is lifted by the upward movement of sliding bar 466 as produced by the operation of motor M, shaft 56, crank arm 464, and extension 466a, and which serves to lift arm 356 of pivot plate 326 to remove coin platforms 328 and 330 from beneath the coins in the channels provided between panel 7 and castings 250 and 280 on the start of the vending operation. Arm 470 is otherwise not related to or involved in the coin return, which is accomplished by downward movement of sliding bar 466 when the operator pulls down lever 476. Sliding bar 466 carries a flange 494 at its upper end, and is slotted at 496 to permit movement upward and downward on pins 498 extending through slots 496 and mounted on panel 4. The lower end of sliding bar 466 is notched as shown at 502 (Figs. 4, 8 and 9). Bar 466 is normally engaged and held against downward movement by a pivoted locking lever 504, mounted on bracket 468. Details of the locking lever 504 are illustrated in Figs. 14, 15, 16 and 17. A magnetizable plug 506 is provided on the outside of pivoted lever 504 and an electromagnet 508 is mounted on a bracket 510 secured to the casing of high price bar switch 184 (Fig. 3), whereby lever 504 may be pulled by the magnet out of the downward path of sliding bar 466 when the electromagnet 508 is energized, as described below. But if no electric current is available, or the plug connecting the machine to the source of current is pulled out, sliding bar 466, and hence the coin return mechanism, cannot be operated due to the obstruction presented by lever 504. When electromagnet 508 is energized, causing lever 504 to be pivoted clockwise as seen in the view presented by Fig. 16, the forward end of lever 504 moves in the direction of panel 4 and engages the outermost one of segments 150. This causes segments 150 to be moved to the left and prevents selector buttons S from being depressed. When electromagnet 508 is de-energized, allowing lever 504 to return in a counterclockwise direction to its original position, bar sections 150 may then be separated by depressing one of the selector buttons S.

To the right of sliding bar 466 is a horizontal latch 511 slidable on panel 4 for horizontal movement on a pair of pins 512 extending through slots 514. This latch bar 511 has a V-shaped end engaging a V-shaped notch 516 in the side of sliding bar 466 at about its mid-portion. The sides of notch 516 act as cam faces to move horizontal latch bar 511 lengthwise to the right. A coiled spring 518 is attached at one end to the left hand pin 512 and at its other end to pin 520 mounted on latch bar 511. Spring 518 thus holds latch bar 511 normally in contact with notch 516 in the sides of vertical sliding bar 466. On its top edge adjacent its mid-portion latch bar 511 carries a finger 522 which extends through hole 524 in panel 7 (Fig. 3) so that as sliding bar 511 is cammed to the right by downward movement of sliding bar 466 on operation of the coin return mechanism, or on upward movement of bar 466 on the starting of the vending operation, finger 522 disengages holding pawl 426 holding the ratchet wheel 380 of the coin control mechanism, and allows ratchet wheel 380 to return to its starting position. The coin totalizer is thus rendered inoperative, and the circuits through coin totalizer switches 480 and 482 are broken, thus preventing further operation of the machine until a new coin or coins are deposited.

Parts of the coin return mechanism mounted on the inside of removable panel 7 are shown in Fig. 5. These include lever 530 pivoted on pin 532 mounted on the inside of panel 7 and having an arm 534 at its forward end in position to be engaged by the bottom surface of flange 494 on the top of sliding bar 466 mounted on side panel 4. At its other end lever 530 is pivotally connected to vertical slide 261, which carries pins 264 and 266 referred to herein above and constituting together with pins 264 and 266 a coin return gate. For details of this gate, see Fig. 13. The slide 261 is mounted on casting 250 which together with panel 7 forms the 10¢ coin channel. Pins 264 and 266 mounted on slide 261 extend into the 5¢, 10¢ and 25¢ coin channels formed by panel 7 and castings 250 and 280, and prevent any coins which may be on the sloping coin platforms 328 and 330 from passing out of the coin channels to the coin return chute until the pins are moved out of the path of the coins. When however the right hand end of lever 530 is pushed downwardly by operation of coin return lever 476, and specifically by the action of flange 494 of sliding bar 466 acting on arm 534 of pivoted lever 530, slide 261 is moved upwardly carrying pins 264 and 266 out of the path of the coins on the sloping coin platforms 328 and 330, thus allowing the coins to roll downwardly into the coin return chute 307 (Fig. 6).

Mechanism is provided for preventing further operation of the coin return when the machine is not electrically connected, or when the vending operation has started by completing the circuit to motor M through motor switch 206. This includes a leaf spring switch 550 (Fig. 5) mounted on the inside of panel 7, comprising upper and lower contact leafs 552a and 552b. Upper contact leaf 552a carries a downwardly extending abutment 556 which is normally engaged by platform 487 on bracket 467 mounted on sliding bar 466, and thus switch 550 is normally held open by platform 487. As sliding bar 466 is moved upwardly by extension 466a, crank arm 464, shaft 56, and motor M on starting the vending operation, upper contact 552a is lifted by platform 487 so that switch 550 remains open. Since switch 550 is electrically connected to electromagnet 508, as will be explained hereinafter in connection with Figs. 51a and 51b, electromagnet 508 is thus unable to withdraw locking lever 504 from the path of downward movement of sliding bar 466, and the coin return lever 476 cannot be operated after starting the vending operation. This mechanism prevents the operator from obtaining both his package of cigarettes and the return of his money. At the same time this mechanism similarly prevents operation of the coin return when the electric current is interrupted or disconnected. The operator is thus prevented from defrauding the machine by way of inserting the proper coins, pressing a selector button S to start the vending operation, then disconnecting the machine from its source of electric current, operating the coin return to get his money back, and then connecting up the machine to its source of electric current, to complete the vending operation and thereby obtain his package of cigarettes. Otherwise however the coin return can be operated at all times. Pulling down coin return lever 476 lowers sliding bar 466 and platform 487, allowing switch 550 to close, thus energizing the electromagnet 508, and allowing sliding bar 466 to be depressed its full operating stroke, and to operate the coin return mechanism, as described above.

A coin cut off device of any suitable nature is further provided to automatically return any coins placed in the machine when the current supplied to it is interrupted. Such a device, as shown in Figs. 3, 5 and 51b, includes a swinging arm 560 having fingers 562, 564, 566 at the ends thereof which extend into the quarter, nickel and dime coin channels respectively of ejector unit 240 to prevent additional coins from passing into the coin channels formed between panel 7 and castings 250 and 280 to trip switches 268, 340 and 342 which when closed actuate the coin totalizer solenoids 442, 440 and 444. A coiled spring (not shown) at the opposite end of pivoted arm 560 tends to pull fingers 562, 564 and 566, into blocking position in the coin channels of unit 240. When the arm is in this position coins inserted in the machine are caused to pass directly from unit 240 to coin return chute 307 by way of chute 242 instead of entering the coin channels between castings 250 and 280. The coin cut off is actuated by an electromagnet 570 which normally holds swinging arm 560 out of the coin channels of unit 240 until the electric current to the magnet is interrupted by the opening of switch 550. Being thus deenergized, arm 560 and fingers 562, 564 and 566 are pulled by the spring associated therewith (not shown) into blocking position as previously stated. When magnet 570 is energized so that fingers 562, 564 and 566 are held away from unit 240, the coins inserted in the machine pass from unit 240 directly to castings 250 and 280.

To coin return lever 530 a downwardly extending arm 620 is attached or forms an integral part thereof and this arm 620 engages the finger 356 of plate 326. A notch 622 is provided on the engaging edge of arm 620 into which finger 356 may slide. Mounted on the inside of panel 7 above coin return lever 530 is a second leaf spring switch 640 having contact arms 642a and 642b which are normally tensioned to contact one another. A downwardly extending plug 644 is mounted on the free end of upper arm 642a in position to be engaged by coin return lever 530 as the latter is operated to move slide 261 upwardly to release the coins held on coin platforms 328 and 330. As coin return lever 530 is thus operated, upper contact arm 642a is lifted away from lower arm 642b, breaking the electrical contact therebetween. As seen in Figs. 51a and 51b this in turn opens an electric circuit through the electromagnet 570 which operates the coin cut off and causes the latter to block the coin channels in unit 240 to prevent additional coins from passing into the coin channels provided between castings 250 and 280.

This mechanism includes a safety feature which operates as follows: In the event that coin platforms 328 and 320 should become partially blocked by a coin being caught between them in any manner, finger 356 engages arm 620 to lift lever 530 very slightly, just enough to lift contact arm 642a away from arm 642b. As seen in Fig. 57a, this opens switch 640 and deenergizes electromagnet 570 which controls the coin cut off. The latter operates to block the coin channels in unit 240 and prevents additional coins from passing into the machine. At the same time this mechanism prevents defrauding the machine by way of inserting a nickel and operating the coin return quickly so as to catch the nickel under the coin return pin 266, thus leaving the coin return open. Then by inserting two dimes which would merely roll through the machine and be returned, and then pushing a selector button S, a 20¢ package of cigarettes could be obtained for a nickel.

Sockets 660, 670 and 680 (Fig. 3) are also mounted on side panel 7 beneath the coin platforms to receive detachable plugs connected to the source of electric current and to removably connect different parts of the electric circuits in the machine. This arrangement facilitates ready removal of side panel 7 for servicing.

*The change maker*

A suitable change maker, generally indicated at 700 in Figs. 4 and 37 and shown in detail in Figs. 26 through 33, is attached to side panel 4 for the purpose of returning a nickel in change to the operator when 25¢ is deposited and a 20¢ package of cigarettes is selected. Change maker 700 is mounted on a bracket 702 secured to side panel 7 at the lower right hand corner thereof. Bracket 702 also serves as the floor of the change maker. A pair of holes 704 are provided in the floor of bracket 702 through which coins may be dropped into the delivery chute of the machine. The change maker as here shown comprises two complete or duplicate sets of mechanisms which are alike. It will be understood that the first set is the one normally operated, and the second is a reserve or auxiliary set to be used only when the first set is exhausted of its supply of nickels.

Vertically mounted at the rear end of bracket 702 are two cylindrical coin tubes or columns 706 and 708. The first column 706 is automatically fed nickels deposited in the machine from opening 302. The second column 708 is manually fed with coins and acts as a surplus reservoir for nickels which is cut into operation if and when the first column 706 is nearly empty of nickels. Each mechanism includes a horizontal sliding bar 712 slidably mounted for horizontal movement on floor bracket 702. One sliding bar 712 at its rear end passes under coin column 706. The other bar passes under column 708. Each sliding bar 712 carries on its forward end a downwardly extending flange 714 and at its rear end is provided with a hole 716. A vertically extending locking tab 718 is provided on each sliding bar 712. Associated with each sliding bar 712 is coiled spring 720 attached at one end to locking tab 718, and at the other end to the front vertical end 722 of bracket 702. Pivotally mounted above each sliding bar 712 is a pivoted locking lever 724. Each lever 724 is pivotally mounted at the front vertical end 722 of bracket 702 and extends horizontally above sliding bar 712. Provided at the rear end of each locking lever 724 is a notch 726 which engages locking tab 718 of the sliding bar beneath the locking lever. Locking lever 724 holds sliding bar 712 in its rearward position against the pull of spring 720, and with the hole 716 filled by the bottom coin in its vertical coin column 706 or 708. Mounted on the vertical plate 730 of bracket 702 over sliding bars 712 are solenoids 734 and 736 having armatures 738 and 740. The lower ends of armatures 738 and 740 are fixed to the free ends of pivoted locking levers 724. As will be explained hereinafter, when solenoid 734 is energized, its armature 738 is withdrawn, lifting locking lever 724 and releasing sliding bar 712 associated with tube 706. When solenoid 736 is energized, bar 712 associated with tube 708 is released in the same manner.

A single pole double throw switch 750 is mounted on vertical plate 730. This switch has one switch terminal connected to solenoid 734 and its other switch terminal connected to solenoid 736. Its common terminal is connected to change maker switch 182. Switch 750 carries a downwardly extending feeler 752 which normally extends through a hole in the bottom of coin tube 706. When tube 706 contains sufficient nickels, feeler 750 is held out of the hole by the nickels. In this position switch 750 connects solenoid 734 to change maker switch 182. When tube 706 is exhausted or nearly exhausted so that no column of nickels exists to hold feeler 752 out of tube 706, solenoid 736 is then electrically connected to change maker switch 182 which now is open to solenoid 734.

In operation, with coin tube 706 filled with nickels, it will be understood that as a circuit through change maker switch 182 is completed (when 25¢ in coins are inserted and a 20¢ selector button is pressed) solenoid 734 will be energized to raise armature 738 and thus release sliding bar 712 beneath tube 706, permitting sliding bar 712 to be drawn forwardly by coiled spring 720. As sliding bar 712 travels forwardly, it carries with it a nickel coin in hole 716, which when it comes into registration with hole 704 will drop the nickel into the delivery chute 760 leading to the main delivery chute of the vending machine. As seen hereinafter the change maker is not operated except when 25¢ in coins are inserted and a 20¢ selector button S is pressed. While normally change is required only when the operator does not have 20¢ in nickels or dimes, but has only a quarter, the change maker will still operate even when a total of 25¢ in nickels and/or dimes is inserted, and a 20¢ selector button is pressed.

However, if coin column 706 is exhausted (or nearly exhausted) feeler 752 will be then unsupported by the column of nickels and will operate switch 750 to cut in solenoid 736 of the manually fed or surplus coin column 708 with its own operating mechanism, and at the same time cut out coin column 706. Thus a nickel in change is delivered first from coin column 706, until it is exhausted or nearly so, and then from surplus coin column 708.

When the change maker has been operated to deliver a nickel change in a vending operation, it is reset by pin or handle 462 of arm 460 of the bell crank attached to the outer end of operating shaft 56. As operated shaft 56 is oscillated by motor M and operating slide 40 is moved rearwardly, handle 462 cams in sliding bar 712 from its dotted line position in Fig. 29 to its dotted line position in Fig. 31, and the particular solenoid 734 or 736 being de-energized, locking lever 724 again drops into locking position in front of locking tab 718 on sliding bar 712, and the mechanism is thus ready for the next change making operation.

*Electrical circuit diagram*

Figs. 51a and 51b present a schematic diagram of the electrical circuit embodied in the present invention to coordinate the electro-mechanical elements described hereinabove. As seen in Fig. 51a, power is coupled to the machine by leads 800 and 802. Electromagnet 570 is coupled to power leads 800 and 802 through switch 640 and motor controlled switch 206. With the machine at rest but coupled to the source of power, switch 640 and motor switch 206 are normally closed to electromagnet 570, thereby permitting the magnet to be energized to hold and its fingers 562 and 564 and 566 of swinging arm 560 out of the coin channels of rejector unit 240.

Coin counting switches 268, 340 and 342 (normally open) are connected through solenoids 440, 444 and 442 and switches 480 and 482 to the source of power by leads 800 and 802. Low price bar switch 180 (normally open) is connected on one side to switch 480, and on the other side to solenoid 200. High price bar switch 184 and change maker switch 182 (both normally open) are connected on one side to switch 482. Switch 184 is connected on the other side to solenoid 200. Change maker switch 187 is connected on its other side to switch 750. Motor M is connected on one side to motor switch 206 leading to power lead 800 and on the other side to power lead 802.

Electromagnet 508 is connected on one side to power lead 800 through motor controlled switch 206, and on the other side to power lead 802 through switch 550 (normally open).

Switch 750 has its common terminal connected to one side of change maker switch 182 and its other terminals connected through solenoids 734 and 736 to power lead 800. The circuit through switch 750 is completed when switch 482 is closed with respect to change maker switch 182 and finger 170 is moved to close switch 182.

*Operation of machine*

Operation of the machine as seen by tracing the passage of coins therethrough is as follows:

Assuming that a quarter is inserted in coin chute 241 and the operator wishes to obtain a 25¢ package of cigarettes, the quarter passes through coin detector and rejector unit 240 past finger 564 of member 560 and enters the 25¢ coin channel between casting 280 and panel 7. As it goes down through this coin channel, it moves switch finger 344 of 25¢ counting switch 340, setting in operation the totalizer. After carrying the switch finger 344 to the bottom of the coin passage, it rolls over the end of switch finger 344 to the position shown in solid lines in Fig. 10. At this point it is stopped from further movement by pin 264. The movement of switch finger 344 by the passage of the coin energizes the coil of solenoid 444 and raises its armature to move ratchet wheel 380 five notches. The machine is now in position so that when the proper selector button S is pushed in the mechanism which will deliver the package of cigarettes will be set in motion. The selector button can not be pushed in unless there is at least one pack of cigarettes to hold down fingers 28 and raise tab 31 of stop member 26 out of the path of the inner end of the selector button. Further movement of the selector button causes stud 152 to strike the corresponding projections 166 on the high price bar 162 and thus to swing the bar on its pivot. This causes switch finger 172 to make contact with switch 184, closing the circuit to solenoid 200. Movement of the armature 210 of solenoid 200 moves lever 114 to the right and pulls its hook 124 out of aperture or notch 126 in slide 40, and thereafter moves locking bar 96 to the right. When the selector button is pushed in, it raises ejector 76 from the position shown in Fig. 34 to that shown in Fig. 39, and the ejector is prevented from returning to its original position when selector button S is released by hooked finger 100 of locking bar 96. The ejector is held up until locking bar 96 is moved to the left to its original position. When switch 184 was closed to energize solenoid 200 as described, its armature acted to close switch 206 to motor M whereby motor M was energized. Movement of motor M, through gear unit G, crank arm 64 and shaft 66 causes delivery tray 40 to slide to the rear of the machine, carrying with it a package of cigarettes. Slide 40 returns to its original position as motor M continues to operate.

If a quarter is inserted and the operator wishes to obtain a 20¢ package of cigarettes which requires the return of a nickel, the operation of the machine is somewhat different as follows:

The operation of the machine is the same as far as the movement of the quarter through the coin control mechanism is concerned. However when the selector button S is pushed in, it moves low price bar 160 and the contact finger 170. Movement of finger 170 acts to close switches 180 and 182. Closing of switch 180 sets the motor M in operation and ejects the package as already described. Closing of switch 182 sends current through switch 750 to solenoid 734. This lifts armature 738 and latch 724 attached thereto, whereupon spring 720 moves slide 712 to the left, as viewed in Figs. 29 and 31, bringing hole 716 which contains the nickel into registry with hole 704 in bed plate 702, allowing the nickel to drop out.

Resetting of the change maker mechanism after release of the nickel is accomplished as follows:

As shaft 56 oscillates, finger 462 on arm 460 oscillates with it, striking depending tab 714 and pushing slide 712 rearwardly of the machine until latch 724 drops down to lock slide 712 in position with hole 716 under the column of nickels in tube 706. The bottom nickel in the stack then drops into the hole and the change maker is reset ready for subsequent operation.

The operation of the machine where other coin combinations are used need not be described in detail since, as explained above, the coin totalizer mechanism is actuated by nickels, dimes or quarters.

Obviously many modifications and variations of the present invention are possible in the light of the above teachings. It is therefore to be understood that within the scope of the appended claims the invention may be practiced otherwise than as specifically described.

We claim:

1. In a coin operated electrical vending machine for vending articles of one or more values for one or more coins of one or more values, a series of compartments containing articles of one or more values, a selector for each compartment, an operating slide positioned beneath said compartments and carrying a plurality of ejector means, each of said ejector means being associated with one of said compartments, each of said ejector means being operated by one of said selectors, a locking member for locking the selected ejector in ejecting position and maintaining the other ejectors in inoperative position, an electric motor for causing reciprocal movement of said slide whereby said selected ejector operates to remove at least one article from one of said compartments, a switch for completing the circuit to said motor, and means operated by said selectors for closing said switch to initiate operation of said motor, whereby to permit said machine to vend an article of the value of the coin or coins inserted.

2. The combination defined by claim 1, wherein said ejector locking member is carried by said slide and is slidable transversely of the direction of movement of said slide, and further including means for moving said locking member to locking position as said motor is actuated to commence movement of said slide, and means for returning said locking member to unlocked position as said slide reaches the end of its movement in a dispensing direction.

3. The combination defined by claim 2, further including means for terminating operation of said motor after said slide has returned to its initial starting position.

4. In a coin operated electrical vending machine for vending articles of one or more values for one or more coins of one or more values, a series of compartments containing articles of one or more values, an operating slide positioned beneath said compartments and carrying a plurality of ejectors for removing articles from said compartments during movement of said slide, means preventing more than one ejector from removing articles from said compartments during movement of said slide, a plurality of manually operated selector elements, each of said selector elements being associated with one of said ejectors and operative to move said ejectors to ejecting position, a plurality of price change bars extending transversely of the direction of movement of said selector elements, each of said bars being mounted for rotation on its own axis, means carried by each one of said bars for causing said each bar to be rotated by a different one of said selector elements when said selector elements are operated, a first plurality of switches corresponding in number to said bars, each of said first switches being positioned to be actuated by one of said bars when said one bar is rotated, a motor, means controlled by said motor for moving said slide, and a motor control circuit including said first switches connected in parallel with each other and additional means adapted to be actuated when coins totaling at least a predetermined amount are deposited in the machine, said control circuit remaining open and said motor remaining inoperative so long as said last-mentioned means are not actuated.

5. The combination of claim 4, further including coin controlled and electrically operated mechanism for actuating said last-mentioned means.

6. Article dispensing mechanism for coin operated vending machines, said mechanism comprising a plurality of vertical compartments for storing articles in stacks, each vertical compartment comprising opposed side walls and means at the front and rear edges of said side walls for preventing forward or rearward movement of articles out of said compartments, each of said compartments having a rear opening at its bottom end whereby articles may be removed therefrom, a series of stationary spaced horizontal members at the bottom ends of said compartments for supporting stacks of articles therein, a slide beneath said compartments, a series of horizontally spaced ejectors pivotally secured to said slide, one ejector for each compartment, said ejectors located in vertical planes located between and parallel to successive ones of said horizontal members, said ejectors normally unlocked and occupying non-ejecting positions below said horizontal members, means for selectively pivoting individual ejectors into ejecting position above the level of said horizontal members, means for positively locking a selected ejector in ejecting position, means for moving said slide rearwardly whereby said selected ejector will penetrate its associated compartment and push the bottom article in said associated compartment through the rear opening thereof onto said slide and for moving said slide forwardly again, and means for discharging articles from said slide during forward movement thereof.

7. Article dispensing mechanism as defined by claim 6 further including means for positively locking non-selected ejectors in non-ejecting position when a selected ejector is locked in ejecting position.

8. Article dispensing mechanism as defined by claim 6 further including means for unlocking said selected ejector before said slide commences its forward movement, whereby said selected ejector is prevented from engaging articles in its associated compartment during forward movement of said slide.

References Cited in the file of this patent

UNITED STATES PATENTS

| | | |
|---|---|---|
| 441,536 | Cornell | Nov. 25, 1890 |
| 762,044 | Garland | June 7, 1904 |
| 1,801,165 | Macke | Apr. 14, 1931 |
| 1,958,763 | Mosfelt | Aug. 15, 1934 |
| 2,076,564 | Hoban | Apr. 13, 1941 |
| 2,250,051 | Patzer | July 22, 1941 |
| 2,323,255 | Sutherland | June 29, 1943 |
| 2,323,981 | Du Grenier | July 13, 1943 |
| 2,333,176 | Hoban | Nov. 2, 1943 |
| 2,377,413 | Fry | June 5, 1945 |
| 2,423,725 | Poole | July 8, 1947 |
| 2,459,008 | Tratsch | Jan. 11, 1949 |
| 2,593,102 | Caruso | Apr. 15, 1952 |
| 2,661,827 | Munz et al. | Dec. 8, 1953 |
| 2,693,299 | Gross | Nov. 2, 1954 |
| 2,717,069 | Driscoll | Sept. 6, 1955 |